United States Patent
Dai et al.

(10) Patent No.: US 11,928,345 B1
(45) Date of Patent: Mar. 12, 2024

(54) METHOD FOR EFFICIENTLY PROCESSING INSTRUCTIONS IN A COMPUTATIONAL STORAGE DEVICE

(71) Applicant: BEIJING SUPERSTRING ACADEMY OF MEMORY TECHNOLOGY, Beijing (CN)

(72) Inventors: Jin Dai, Beijing (CN); Yunsen Zhang, Beijing (CN)

(73) Assignee: BEIJING SUPERSTRING ACADEMY OF MEMORY TECHNOLOGY, Beijing (CN)

( * ) Notice: Subject to any disclaimer, the term of this patent is extended or adjusted under 35 U.S.C. 154(b) by 0 days.

(21) Appl. No.: 18/312,968

(22) Filed: May 5, 2023

Related U.S. Application Data

(63) Continuation of application No. PCT/CN2023/086244, filed on Apr. 4, 2023.

(30) Foreign Application Priority Data

Aug. 17, 2022 (CN) .......................... 202210985642.6

(51) Int. Cl.
*G06F 3/06* (2006.01)
(52) U.S. Cl.
CPC .......... *G06F 3/0631* (2013.01); *G06F 3/0604* (2013.01); *G06F 3/0679* (2013.01)
(58) Field of Classification Search
CPC .............................. G06F 6/0631; G06F 6/0604
See application file for complete search history.

(56) References Cited

U.S. PATENT DOCUMENTS

| | | | |
|---|---|---|---|
| 2022/0057959 A1* | 2/2022 | Yang | G06F 13/28 |
| 2022/0188028 A1 | 6/2022 | Mesnier et al. | |
| 2022/0236911 A1* | 7/2022 | Jones | G06F 3/0679 |

FOREIGN PATENT DOCUMENTS

| | | |
|---|---|---|
| CN | 106502581 A | 3/2017 |
| CN | 107704344 A | 2/2018 |

(Continued)

OTHER PUBLICATIONS

Micron, TN-29-19: NAND Flash 101 Introduction, 2006 [retrieved from internet Jul. 13, 2023][<URL:https://user.eng.umd.edu/~blj/CS-590.26/micron-tn2919.pdf>] (Year: 2006).*

(Continued)

*Primary Examiner* — David Yi
*Assistant Examiner* — Nicholas A. Paperno
(74) *Attorney, Agent, or Firm* — Brooks Kushman P.C.

(57) ABSTRACT

Provided are a computational storage system, computational storage processor, solid-state drive (SSD) and data storing method. The method may include receiving a first storing instruction based on a storage object, generating a second storing instruction based on a flash memory address according to information carried by the first storing instruction and SSD resource information maintained locally, and sending the generated second storing instruction to the SSD. The SSD resource information may include resource occupation information in the SSD. Generating the second storing instruction may include parsing an identification of a storage object, data length information and a starting source address of entire data, allocating a flash memory address or addresses in one or more SSDs for storing data of the storage object according to the data length information and the resource occupancy information in the SSD, and generating the second storing instructions for each SSD.

18 Claims, 3 Drawing Sheets

(56) References Cited

FOREIGN PATENT DOCUMENTS

| | | |
|---|---|---|
| CN | 109240603 A | 1/2019 |
| CN | 106502581 B | 5/2019 |
| CN | 113424144 A | 9/2021 |
| CN | 113885945 A | 1/2022 |
| CN | 113918101 A | 1/2022 |
| CN | 114116634 A | 3/2022 |
| CN | 114116634 B | 4/2022 |
| CN | 115357540 A | 11/2022 |

OTHER PUBLICATIONS

Remi et al., Flash-based SSDs, Univeristy of Wisconsin-Madison, 2022 [retrieved from internet Jul. 13, 2023][<URL:https://web.archive.org/web/20220712165034/https://pages.cs.wisc.edu/~remzi/OSTEP/>] (Year: 2022).*

First Office Action for Chinese Application No. 202210985642.6, dated Jan. 19, 2023, 15 Pages.

International Search Report and Written Opinion for International Application No. PCT/CN2023/086244, dated Jun. 21, 2023, 13 Pages (including English translation).

* cited by examiner

METHOD FOR EFFICIENTLY PROCESSING INSTRUCTIONS IN A COMPUTATIONAL STORAGE DEVICE

CROSS-REFERENCE TO RELATED APPLICATIONS

This application is a continuation of International PCT Application No. PCT/CN2023/086244 filed Apr. 4, 2023, which claims priority to Chinese Patent Application No. 202210985642.6 filed on Aug. 17, 2022, which are hereby incorporated herein by reference in their entireties.

TECHNICAL FIELD

Embodiments of the present disclosure relate to data storage technology, in particular to a storage system and a Computational storage processor thereof, a solid-state drive and data reading and writing methods.

BACKGROUND

At present, some architectures in the field of computer storage are a storage architecture based on a front-end of a CSP (Computational Storage Processor). However, with the development of the field of Computational storage, it is required that the instructions of object storage or key value storage received by storage devices are no longer reading and writing instructions based on block address, so when the CSP is used as the front-end, a large amount of data will flow through the CSP, and extra data copies will increase the CSP delay and power consumption. In order to adapt to the development of the field of computational storage based on existing related devices, one or more CSPs may be added to solve this problem, but this solution has a high cost-effectiveness ratio, so an effective solution is urgent to research.

SUMMARY

The following is a summary of the subject matters described in detail in this document. This summary is not intended to limit the scope of protection of the claims.

Some embodiments of the present application provide a storage system, which may include a solid-state drive (SSD) and a computational storage processor (CSP), wherein communication between the SSD and CSP, communication between the SSD and the external of the storage system and communication between the CSP and the external of the storage system are performed through a point-to-point communication protocol of a peripheral component interconnect express (PCIe) bus.

The CSP is configured to receive a first operation instruction based on a storage object from the external, generate a second operation instruction based on the flash memory address according to information carried by the first operation instruction and the SSD resource information maintained locally, and send the generated second operation instruction to the SSD.

The SSD is configured to, after receiving the second operation instruction, exchange the data of the storage object with the external according to information carried by the second operation instruction.

Herein, the first operation instruction includes a first storing instruction and a first reading instruction, and the second operation instruction includes a second storing instruction and a second reading instruction.

Some embodiments of the present application provide a computational storage processor (CSP) in a storage system, which may include:
a first peripheral component interconnect express (PCIe) bus interface configured to be connected to a PCIe bus to communicate with a solid-state drive (SSD) in the storage system and an external of the storage system through the PCIe bus;
a storage management system configured to receive a first operation instruction based on a storage object from the external through the first PCIe bus interface, generate a second operation instruction based on the flash memory address according to the information carried by the first operation instruction and the SSD resource information maintained locally and send the generated second operation instruction to the SSD, wherein the first operation instruction includes a first storing instruction and a first reading instruction, and the second operation instruction includes a second storing instruction and a second reading instruction; and
an information manager configured to maintain the SSD resource information in the storage system.

Some embodiments of the present application provide a solid-state drive (SSD) in a storage system, which may include a main control chip and a flash memory chip, wherein the main control chip may include:
a second peripheral component interconnect express (PCIe) bus interface, configured to be connected to a PCIe bus to communicate with a computational storage processor (CSP) in the storage system and an external of the storage system through the PCIe bus; and
a storage controller, configured to receive the second operation instruction based on the flash memory address sent by the CSP, and exchange data of a storage object with the external according to the information carried by the second operation instruction, wherein the second operation instruction includes a second storing instruction and a second reading instruction.

Some embodiments of the present application provide a data storing method, applied to a computational storage processor (CSP) in a storage system, which communicates with a solid-state drive (SSD) in the storage system and an external of the storage system through the peripheral component interconnect express (PCIe) bus, and the method may include:
receiving a first storing instruction based on a storage object from the external; and
generating a second storing instruction based on the flash memory address according to the information carried by the first storing instruction and the SSD resource information maintained locally and sending generated second storing instruction to the SSD.

Some embodiments of the present application provide a data storing method applied to a solid-state drive (SSD) in a storage system, which communicates with a computational storage processor (CSP) in the storage system and an external of the storage system through the peripheral component interconnect express (PCIe) bus, and the method may include:
receiving a second storing instruction based on a flash memory address sent by the CSP, and parsing the starting source address of the data to be stored this time and a flash memory address in the SSD carried by the second storing instruction; and
reading data of a storage object from the external according to the parsed starting source address, and storing the read data in the parsed flash memory address.

Some embodiments of the present application provide a data reading method applied to a computational storage processor (CSP) in a storage system, which communicates with a solid-state drive (SSD) in the storage system and an external of the storage system through the peripheral component interconnect express (PCIe) bus, and the method may include:

receiving a first reading instruction based on a storage object from the externa; and generating a second reading instruction based on a flash memory address according to information carried by the first reading instruction and SSD resource information maintained locally, and sending the second reading instruction to the SSD.

Some embodiments of the present application provide a data reading method applied to a solid-state drive (SSD) in a storage system, which communicates with a computational storage processor (CSP) in the storage system and an external of the storage system through the peripheral component interconnect express (PCIe) bus, and the method may include:

receiving a second reading instruction based on the flash memory address sent by the CSP, and parsing a flash memory address of data to be read this time in the present SSD and a starting address for data reception that are carried by the second reading instruction; and reading the data of the storage object from the present SSD according to the parsed flash memory address, and storing the read data in the parsed starting address for data reception of the external.

Some embodiments of the present application provide a computational storage processor (CSP), which may include a third peripheral component interconnect express (PCIe) bus interface, and a first logic circuit assembly coupled to the third PCIe bus interface, wherein the first logic circuit assembly is configured to perform the data storing method of the fourth aspect and the data reading method of the sixth aspect.

Some embodiments of the application also provide a main control chip of the solid-state drive (SSD), which may include a fourth peripheral component interconnect express (PCIe) bus interface, and a second logic circuit assembly coupled to the fourth PCIe bus interface, wherein the second logic circuit assembly is configured to perform the data storing method of the fifth aspect and the data reading method of the seventh aspect.

Some embodiments of the present application provide a non-volatile storage medium having a computer program stored thereon, wherein when the computer program is executed by a processor, the data storing methods of the fourth and fifth aspects, and the data reading methods of the sixth and seventh aspects are performed.

Other features and advantages of the present disclosure will be set forth in the following specification, and moreover, partially become apparent from the specification, or are understood by implementing the present disclosure. The objectives and advantages of the present disclosure may be achieved through structures particularly pointed out in the specification and the drawings.

Other aspects may be understood upon reading and understanding the drawings and detailed description.

BRIEF DESCRIPTION OF THE DRAWINGS

The drawings are used to provide further understanding of the technical solutions of the present disclosure, constitute a part of the specification, and together with the embodiments of the present disclosure, are used to explain the technical solutions but not to form limitations to the technical solutions of the present disclosure.

DETAILED DESCRIPTION

A plurality of embodiments are described in the present application. However, the description is exemplary and unrestrictive. Moreover, it is apparent to those of ordinary skills in the art that there may be more embodiments and implementation solutions within the scope of the embodiments described in the present application. Although many possible combinations of features are shown in the accompanying drawings and discussed in specific implementations, many other combinations of the disclosed features are also possible. Unless expressly limited, any feature or element of any embodiment may be used in combination with, or may replace, any other feature or element in any other embodiment.

The present application includes and conceives combinations of features and elements well known to those of ordinary skills in the art. The embodiments, features and elements that have been disclosed in the present application may be combined with any conventional features or elements to form unique inventive solutions defined by the claims. Any feature or element of any embodiment may also be combined with a feature or an element from another inventive solution to form another unique inventive solution defined by the claims. Therefore, it is to be understood that any feature shown and/or discussed in the present application may be implemented independently or in any appropriate combination. Therefore, the embodiments are not to be limited except the limitation by the appended claims and equivalents thereof. Moreover, various modifications and variations may be made within the scope of the appended claims.

Moreover, when representative embodiments are described, the specification may have presented a method and/or a process as a particular order of acts. However, the method or the process should not be limited to the acts with the specific order on a premise that the method or the process is independent of the specific order of the acts described herein. Those of ordinary skills in the art will understand that other orders of acts may also be possible. Therefore, the specific order of the acts illustrated in the specification should not be interpreted as a limitation on claims. Moreover, the execution of the acts of the method of the process in the claims for the method and/or the process should not be limited to the written order, and it can be easily understood by those skilled in the art that these orders may be changed and still fall within the spirit and scope of the embodiments of the present application.

First Aspect

Figure 1:
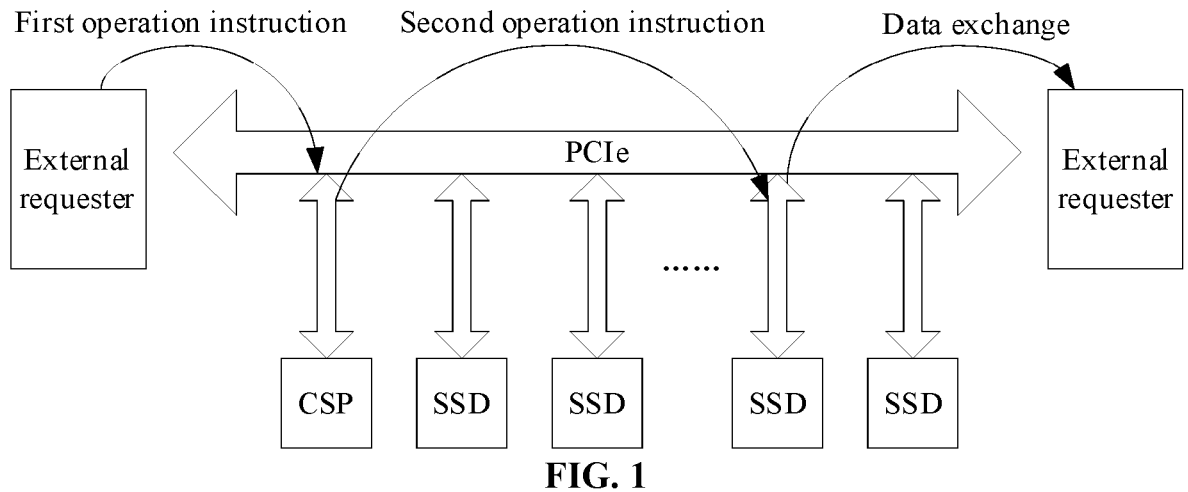
FIG. 1 is a schematic diagram of a structure of a storage system according to an embodiment of the present application.

Some embodiments of the present application provide a storage system, as shown in FIG. 1, which may include a Solid-State Drive (SSD) and a computational storage processor (CSP).

Communication between the SSD and the CSP, communication between the SSD and the external of the storage system, and communication between the CSP and the external of the storage system may be performed through a point-to-point communication protocol of a Peripheral Component Interconnect Express (PCIe) bus.

The CSP is configured to receive a first operation instruction based on a storage object from the external, generate a second operation instruction based on a flash memory address according to information carried by the first operation instruction and SSD resource information maintained locally, and send the second operation instruction to the SSD.

The SSD is configured to exchange data of the storage object with the external according to the information carried by the second operation instruction after receiving the second operation instruction.

Herein, the first operation instruction includes a first storing instruction and a first reading instruction, and the second operation instruction includes a second storing instruction and a second reading instruction.

In an exemplary embodiment of the present application, the external of the storage system may include one or more requesters.

In an exemplary embodiment of the present application, the storage system may include a CSP and a plurality of SSDs, both of which are connected to the PCIe bus and communicate through the point-to-point communication protocol.

In an exemplary embodiment of the present application, the CSP receives an external storage request through the PCIe bus, namely, the first operation instruction (the first operation instruction may be a first storing instruction or a first reading instruction), which may contain information about the storage object. According to the information about the storage object and the stored resource information of each SSD, the CSP may perform a processing, such as allocating an SSD address for the data of the storage object, or looking up an SSD address in which the data of the storage object is stored, or the like, and may generate the corresponding second operation instruction (corresponding to the first operation instruction, and being a second storing instruction or a second reading instruction, that is, the second operation instruction is the second storing instruction when the first operation instruction is the first storing instruction, and the second operation instruction is the second reading instruction when the first operation instruction is the first reading instruction) according to the processing result. By using the point-to-point communication mechanism of the PCIe bus, the CSP may send the generated second operation instruction to the SSD allocated or looked up, so that the SSD may directly exchange data with an external requester (also called an external data exchanger in this case) according to the second operation instruction instead of via the CSP, only instructions are transmitted between the CSP and the SSD, there will be no large amount of data flowing through the CSP, and the CSP will not copy extra data, thus reducing the workload of the CSP greatly, and reducing the delay and the power consumption.

The solution of the embodiments of the present application is described below in detail from two aspects, i.e., writing data and reading data, respectively.

In an exemplary embodiment of the present application, when the first operation instruction sent from the external is a first storing instruction, the first storing instruction may include, but is not limited to, an identification of the storage object, data length information, and a starting source address of the entire data.

In an exemplary embodiment of the present application, the SSD resource information includes resource occupation information in the SSD; the CSP is configured to, after receiving the first storing instruction, generate a second operation instruction based on the flash memory address by the following way and send it to the SSD:

parsing an identification of a storage object, data length information and a starting source address of entire data, which are carried by the first storing instruction;

allocating a flash memory address or addresses in one or more SSDs for storing data of the storage object according to the data length information and the resource occupancy information in the SSD; and determining a starting source address of a portion of data to be stored each time according to the starting source address of the entire data of the storage object and an offset of the portion of data of the storage object to be stored each time in the entire data of the storage object; and generating one or more second storing instructions for each SSD allocated with a flash memory address and sending the one or more second storing instructions to the SSD, wherein each second storing instruction carries a starting source address of data to be stored by the SSD and a flash memory address for data to be stored.

In an exemplary embodiment of the present application, the flash memory address is any form of address provided to the external by the SSD, which may be, for example, an address of a flash memory page, a flash memory block or a storage block, or may be an address segment of a flash memory page, a flash memory block, or a storage block. When the flash memory address is a storage block address, the SSD provides a logical address to the external, and when the flash memory address is an address of a flash memory page or a flash memory block, the SSD provides an operation interface of a physical address to the external. In the embodiment of the present application, it is illustrated by taking an example in which the flash memory address is an address of a flash memory page or a flash memory block.

In an exemplary embodiment of the present application, the resource occupancy information in the SSD may include, but is not limited to, addresses of all SSDs included in the storage system, addresses of at least one of the flash memory pages and the flash memory block in each SSD, resource occupancy information for each flash memory page, an identification and offset of a storage object corresponding to each occupied flash memory page, and the like.

In an exemplary embodiment of the present application, the CSP may determine a flash memory address or addresses in one or more SSDs that may store the data of the storage object to be stored currently according to the resource occupancy information, and allocate one or more flash memory addresses to this storage object according to a size of the data amount of the storage object to be stored.

In an exemplary embodiment of the present application, the CSP may determine whether the data of the storage object to be stored is big data or small data according to the data length information carried by the first storing instruction, and allocate a corresponding flash memory address according to the determined data size. However, embodiments of the present disclosure are not limited thereto, and data to be stored may be classified into more classes, or data to be stored may not be classified into big data and small data, and so on.

In an exemplary embodiment of the present application, when the data length information is less than or equal to a preset first data amount threshold, the data may be determined as small data; and when the data length information is larger than the preset first data amount threshold, the data may be determined as big data.

In an exemplary embodiment of the present application, the first data amount threshold may be the storage data amount of one flash memory page, or may be other self-defined data amount, and the detailed value of the first data amount threshold is not limited here.

In an exemplary embodiment of the present application, when the data to be stored is small data, the CSP may allocate only one flash memory page for the data, and when the data to be stored is big data, the CSP may allocate a plurality of flash memory pages for the data, or allocate one or more flash memory blocks.

In an exemplary embodiment of the present application, when the CSP allocates at least one of the plurality of flash memory pages and the plurality of flash memory blocks for big data, the plurality of flash memory pages may be flash memory pages with successive addresses, and the plurality of flash memory blocks may be flash memory blocks with successive addresses, so that one address segment with successive addresses may be allocated for the big data.

In an exemplary embodiment of the present application, when a large amount of storage objects to be stored are all small data, a second storing instruction may be generated each time a small data is written. In another embodiment, a plurality of small data which requires to be written successively may be combined and then be written, i.e., a second storing instruction may be generated after the combination, thereby reducing the task load of the storage system, improving the performance of the storage system and reducing the power consumption.

In an exemplary embodiment of the present application, for example, after receiving a plurality of first writing instructions about the plurality of small data, the information carried by the plurality of first writing instructions may be combined, one second storing instruction is generated according to the combined information and the SSD resource information maintained locally and sent to the SSD, and then the SSD obtains each small data respectively according to the corresponding starting source address and stores it in the allocated flash memory address.

In an exemplary embodiment of the present application, when the starting source address of the plurality of small data is successive, the plurality of successive flash memory addresses may be allocated for the plurality of small data according to an arrangement order of small data stored in the plurality of starting source addresses, and the arrangement order of the small data stored in the plurality of successive flash memory addresses is the same as the arrangement order of the small data stored in the plurality of starting source addresses.

In an exemplary embodiment of the present application, when the storage object is allocated to the plurality of different SSDs or different flash memory addresses in the same SSD, data amount required for each flash memory address may be acquired from an external requester and stored in the flash memory address, so a starting source address of a portion of data to be stored each time may be determined according to the starting source address of the data of the entire storage object, the offset of the portion of data of the storage object to be stored each time in the data of the entire storage object; and the corresponding data for storage is thus acquired according to the starting source address of the portion of data.

In an exemplary embodiment of the present application, when the CSP sends the second storing instruction to the SSD, one second storing instruction may be sent to each allocated flash memory address, or one second storing instruction may be sent for a plurality of successive flash memory addresses (i.e. an address segment).

In an exemplary embodiment of the present application, the second storing instruction may include, but is not limited to, an NVMe (Non-Volatile Memory express) storing instruction.

The NVMe is a mainstream SSD protocol in the market at present, which is a transport protocol based on the physical layer of the PCIe bus, and its characteristic is that it only sends reading and writing instructions, but does not directly guide data exchange. For example, the reading instruction only includes the storage address of the SSD and the address for data reception, so the SSD may execute a large amount of instructions according to its own order, and then transmit data to the reception address through a PCIe transmission mechanism when data transmission is required.

In an exemplary embodiment of the present application, the SSD is configured to, after receiving the second storing instruction, exchange the data of the storage object with the external by the following way: parsing the starting source address and the flash memory address carried by the second storing instruction, reading data of a default size of the storage object from the external according to the parsed starting source address and storing the read data in the parsed flash memory address; or, the second storing instruction sent by the CSP further carries data amount information of the storage object to be stored this time, and the SSD is configured to, when the SSD receives the second storing instruction, exchange the data of the storage object with the eternal by the following way: parsing the starting source address, the flash memory address and the data amount information carried by the second storing instruction, reading data of the corresponding data amount of the storage object from the external according to the parsed starting source address and the data amount information, and storing the read data into the parsed flash memory address. The corresponding data amount is the data amount indicated by the data amount information.

In an exemplary embodiment of the present application, the second storing instruction may only include the starting source address and flash memory address of the storage object, or may contain both the starting source address and the flash memory address (for example, the starting address of a plurality of flash memory pages or blocks) of the storage object and the data amount information of the storage object.

In an exemplary embodiment of the present application, when the second storing instruction is an NVMe storing instruction, the NVMe storing instruction may be a common NVMe instruction, including a starting source address and a flash memory address of the storage object; or, the NVMe storing instruction may be an extended NVMe instruction, including a starting source address of the storage object, data amount information, and a flash memory address.

In an exemplary embodiment of the present application, the data amount information may contain, but is not limited to, a total data capacity (e.g., 32K, 64K, etc.), a total number of at least one of the flash memory pages and the flash memory blocks which are required, and the like.

In an exemplary embodiment of the present application, for example, for the small data, the data may be stored through only one flash memory page, so one flash memory page may be allocated for the small data, and only the starting source address of the storage object and the address of the flash memory page are included in the second storing instruction.

In an exemplary embodiment of the present application, for example, for the big data, a plurality of flash memory pages are required to store the data, so for the big data, a plurality of flash memory pages may be allocated and data amount information may be attached, for example, a total number of the required flash memory pages is attached, and a starting source address, a flash memory address (a starting address of at least one of the allocated plurality of flash memory pages and flash memory blocks), and data amount information of the storage object are contained in the second storing instruction.

In an exemplary embodiment of the present application, the size of each flash memory block may be 16 kB, so the starting address of the first flash memory block is equal to the original starting address, the starting address of the second flash memory block is equal to the original starting address+16 kB, and so on, and a starting address of any one of the flash memory blocks may be determined. For the flash memory page, the principle is the same, and will not be repeated here.

In an exemplary embodiment of the present application, when the first operation instruction transmitted from the external is a first reading instruction, the first reading instruction may include, but is not limited to, an identification of the storage object and a starting address for data reception.

In an exemplary embodiment of the present application, the SSD resource information includes a flash memory address in the SSD in which the data of the storage object is stored; the CSP is configured to, after receiving the first reading instruction, generate the second operation instruction based on the flash memory address by the following way and send the generated second operation instruction to the SSD:

parsing the identification of the storage object and the starting address for data reception carried by the first reading instruction;

looking up the flash memory address or addresses in one or more SSDs in which the data of the storage object is stored according to the identification of the storage object, wherein the flash memory address or addresses are saved in advance; and generating one or more second reading instructions for each SSD storing the data of the storage object and sending them to the SSD, wherein each second reading instruction carries the flash memory address of the data to be read this time in the SSD and the starting address for data reception.

In an exemplary embodiment of the present application, the CSP may look up the flash memory address of the data of the storage object to be read in the SSD according to the identification of the storage object contained in the first reading instruction, and carry the flash memory address and the starting address for data reception of the external requester in the second reading instruction and send the second reading instruction to the SSD.

In an exemplary embodiment of the present application, the data of the storage object to be read may be big data or may be small data. When the data of the storage object is big data and occupies (e.g., exactly fully, or not fully with waste) at least one of one or more complete flash memory pages and flash memory blocks, the addresses of at least one of the one or more flash memory pages and flash memory blocks, and the starting address for data reception may be carried only in the second reading instruction. When the data of the storage object is big data and occupies at least one of the plurality of successive flash memory pages and flash memory blocks, the starting address of at least one of the plurality of successive flash memory pages and flash memory blocks may be carried in the second reading instruction, and the number of at least one of the flash memory pages and the flash memory blocks is indicated by the data amount information, so the starting addresses of at least one of the plurality of successive flash memory pages and the flash memory blocks, the data amount information and the starting address for data reception of the storage object may be carried in the second reading instruction. When the data of the storage object is small data and only occupies one portion of the space of one flash memory page, and the other portion of the space of the flash memory page is occupied by other data, both the address of the flash memory page and the offset of the flash memory address of the storage object to be read may be carried in the second reading instruction, so as to accurately read the required data in the flash memory page according to the offset, so the second reading instruction may carry the address of the flash memory page and offset thereof, as well as the starting address for data reception.

In an exemplary embodiment of the present application, the second reading instruction may contain, but is not limited to, an NVMe reading instruction.

In an exemplary embodiment of the present application, the second reading instruction may be an NVMe reading instruction, and the flash memory address carried by the NVMe reading instruction is an address of one flash memory page; and alternatively, the second reading instruction may be an extended NVMe storing instruction, and the flash memory address carried by the extended NVMe reading instruction is an address segment formed by addresses of a plurality of successive flash memory pages, and the address segment may be represented by a starting address and data amount information.

In an exemplary embodiment of the present application, when the second reading instruction is an NVMe reading instruction, the NVMe reading instruction may be an ordinary NVMe instruction, including a flash memory address and a starting address for data reception of the storage object; and alternatively, the NVMe storing instruction may be an extended NVMe instruction, including a flash memory address, data amount information, and a starting address for data reception of the storage object.

In an exemplary embodiment of the present application, the data amount information may contain, but is not limited to, a total data capacity (e.g., 32K, 64K, etc.), a total number of at least one of the flash memory pages and the flash memory blocks which are required, and the like.

In an exemplary embodiment of the present application, the offset is referred to an offset of the small data in one flash memory page relative to the flash memory address of the flash memory page, and the offset may be represented by two offset quantities.

In an exemplary embodiment of the present application, the small data may only be stored in one flash memory page, which may completely occupy one flash memory page, or may only occupy one portion of the flash memory page, and the other portion is occupied by other small data. Therefore, for the small data that completely occupies one flash memory page, only the starting address for data reception of the storage object and the address of the flash memory page may be included in the second reading instruction, and for the small data that occupies one flash memory page together with other small data, the starting address for data reception of the storage object, the address of the flash memory page and the offset of the small data may be included in the second reading instruction, which is used for SSD to read data from the flash memory page and then select required data from the read data according to the offset.

In an exemplary embodiment of the present application, for the big data, a plurality of flash memory pages are required to store the data, so the data amount information (e.g., the total number of flash memory pages for storage) may be attached when the big data is read, and the starting address for data reception, the flash memory address (the starting address of at least one of the one or more flash memory pages and flash memory blocks for storage), and the data amount information of the storage object are included in the second reading instruction.

In an exemplary embodiment of the present application, the size of each flash memory block may be 16 kB, so the starting address of the first flash memory block is equal to the original starting address, the starting address of the second flash memory block is equal to the original starting address+16 kB, and so on, and a starting address of any one of the flash memory blocks may be determined. For the flash memory page, the principle is the same, and will not be repeated here.

In an exemplary embodiment of the present application, the SSD is configured to, after receiving the second reading instruction, exchange the data of the storage object with the external by the following way: parsing the flash memory address and the starting address for data reception carried by the second reading instruction, reading data to be read this time from the SSD according to the parsed flash memory address, and sending the read data to the starting address of data reception of the external.

In an exemplary embodiment of the present application, for the second reading instruction containing only a flash memory address and a starting address for data reception, the SSD may read out all the data stored in at least one of one or more corresponding flash memory pages and flash memory blocks in the present SSD according to the flash memory address, and store the data into the starting address for data reception.

In an exemplary embodiment of the present application, the second reading instruction sent by the CSP may also carry the data amount information of the storage object, and the SSD is configured to, when the SSD receives the second reading instruction, exchange the data of the storage object with the external by the following way: parsing the flash memory address, the starting address for data reception and the data amount information carried by the second reading instruction, reading data to be read this time from the SSD according to the parsed flash memory address and data amount information, and sending the read data to the starting address of data reception of the external.

In an exemplary embodiment of the present application, for the second reading instruction containing a flash memory address, data amount information and a starting address for data reception, the SSD may read out all the data stored in at least one of corresponding plurality of flash memory pages and flash memory blocks according to the flash memory address and the data amount information, and store the data to the starting address for data reception.

In an exemplary embodiment of the present application, the second reading instruction sent by the CSP may also carry an offset of the flash memory address of the storage object, and the SSD is configured to, when the SSD receives the second reading instruction, exchange the data of the storage object with the external by the following way: parsing the flash memory address, offset thereof and the starting address for data reception carried by the second reading instruction, reading a portion of the stored data from one flash memory page according to the parsed flash memory address and offset thereof, or reading one page of data from one flash memory page according to the parsed flash memory address, and according to the offset, selecting required data from the page of data and storing the data in the starting address for data reception of the external.

In an exemplary embodiment of the present application, for the second reading instruction containing a flash memory address, an offset, and a starting address for data reception, the SSD may read out all the data stored in one corresponding flash memory page according to the flash memory address, select required data from the read data according to the offset, and store the selected data to the starting address for data reception; and alternatively, a portion of the stored data may be read from one flash memory page according to the parsed flash memory address and offset thereof.

In an exemplary embodiment of the present application, the SSD may further be configured to, after successfully exchanging the data of the storage object with the external according to the information carried by the second operation instruction, return a success response to the CSP; and the CSP may further be configured to, after receiving a success response to all the second operation instructions sent, return a success response to the sender of the first operation instruction, and update the maintained SSD resource information.

Second Aspect

Figure 2:
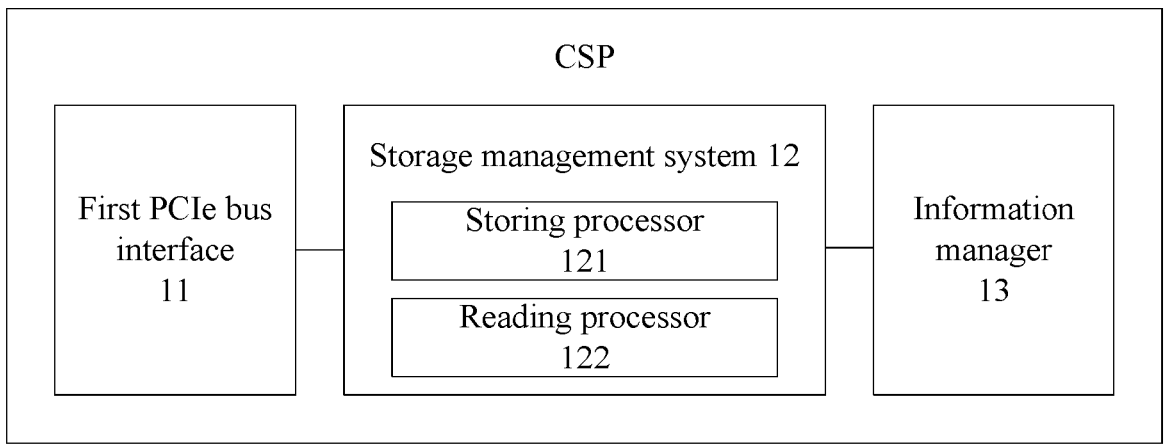
FIG. 2 is a block diagram of a first composition of a CSP in a storage system to an embodiment of the present application.

An embodiment of the present application provides a computational storage processor in a storage system, as shown in FIG. 2, which may include a first PCIe bus interface 11, a storage management system 12 and an information manager 13.

The first PCIe bus interface 11 is configured to be connected to a PCIe bus to communicate with a solid-state drive (SSD) in the storage system and the external of the storage system through the PCIe bus.

The storage management system 12 is configured to receive a first operation instruction based on a storage object from the external through the first PCIe bus interface 11, generate a second operation instruction based on the flash memory address according to the information carried by the first operation instruction and the SSD resource information maintained locally and send the generated second operation instruction to the SSD, wherein the first operation instruction includes a first storing instruction and a first reading instruction, and the second operation instruction includes a second storing instruction and a second reading instruction.

The information manager 13 is configured to maintain the SSD resource information in the storage system.

In an exemplary embodiment of the present application, the storage management system 12 of the CSP receives an external storage request through the first PCIe bus interface 11, that is, the first operation instruction (the first operation instruction may be a first storing instruction or a first reading instruction) which may contain information about the storage object. A processing, such as allocating an SSD address for the data of the storage object, or looking up an SSD address in which the data of the storage object is stored, or the like, may be performed according to the information about the storage object and the resource information of each SSD stored by the information manager 13, and a corresponding second operation instruction (corresponding to the first operation instruction, and being a second storing instruction or a second reading instruction) is generated according to the processing result. By using the point-to-point communication mechanism of the PCIe bus, the storage management system 12 may send the generated second operation instruction to the SSD allocated or looked up, so that the SSD may directly exchange data with the external requester according to the second operation instruction instead of via the CSP, only instructions are transmitted between the CSP and the SSD, there will be no large amount of data flowing through the CSP, and the CSP will not copy extra data, thus reducing the workload of the CSP greatly, and reducing the delay and the power consumption.

The solution of the embodiments of the present application is described below in detail from two aspects, i.e., writing data and reading data, respectively.

In an exemplary embodiment of the present application, the storage management system 12 may include a storing processor 121. The storing processor module 121 may be configured to: receive a first storing instruction from the external through the first PCIe bus interface 11, and parse an identification of a storage object, data length information and a starting source address of the entire data carried by the first storing instruction; allocate a flash memory address or addresses in one or more SSDs for storing data of the storage object according to the data length information and the resource occupancy information in the SSD; and determine a starting source address of a portion of data to be stored each time according to the starting source address of the entire data of the storage object and an offset of the portion of data of the storage object to be stored each time in the entire data of the storage object; and generate one or more second storing instructions for each SSD allocated with a flash memory address, and send the one or more second storing instructions to the SSD, wherein each second storing instruction carries a starting source address of data to be stored this time by the SSD and a flash memory address for data to be stored.

In an exemplary embodiment of the present application, the flash memory address is any form of address provided to the external by the SSD, which may be, for example, an address of a flash memory page, a flash memory block or a storage block, or may also be an address segment of a flash memory page, a flash memory block, or a storage block. When the flash memory address is a storage block address, the SSD provides a logical address to the external, and when the flash memory address is an address of a flash memory page or a flash memory block, the SSD provides an operation interface of a physical address to the external. In the embodiment of the present application, it is illustrated by taking an example in which the flash memory address is an address of a flash memory page or a flash memory block.

In an exemplary embodiment of the present application, when the first operation instruction sent from the external requester is a first storing instruction, the first storing instruction may include, but is not limited to, an identification of the storage object, data length information, and a starting source address of the entire data.

In an exemplary embodiment of the present application, the resource occupancy information in the SSD may include, but is not limited to, addresses of all SSDs included in the storage system, addresses of at least one of the flash memory pages and the flash memory blocks in each SSD, resource occupancy information for each flash memory page, an identification and offset of a storage object corresponding to each occupied flash memory page, and the like.

In an exemplary embodiment of the present application, the storing processor 121 may determine a flash memory address or addresses in one or more SSDs, in which the data of the storage object to be stored currently may be stored, according to the resource occupancy information, and allocate one or more flash memory addresses to this storage object according to the size of the data amount of the storage object to be stored.

In an exemplary embodiment of the present application, the storing processor 121 may determine whether the data of the storage object to be stored is big data or small data according to the data length information carried by the first storing instruction, and allocate a corresponding flash memory address according to the determined the size of the data.

In an exemplary embodiment of the present application, when the data length information is less than or equal to a preset first data amount threshold, the data may be determined as small data; and when the data length information is larger than the preset first data amount threshold, the data may be determined as big data. The first data amount threshold may be the storage data amount of one flash memory page, or may be the self-defined data amount, and the detailed value of the first data amount threshold is not limited here.

In an exemplary embodiment of the present application, when the data to be stored is small data, the storing processor 121 may allocate only one flash memory page for this data, and when the data to be stored is big data, the storing processor 121 may allocate a plurality of flash memory pages for the data, or allocate one or more flash memory blocks.

In an exemplary embodiment of the present application, when the storing processor 121 allocates at least one of the plurality of flash memory pages and the plurality of flash memory blocks for big data, the plurality of flash memory pages may be flash memory pages with successive addresses, and the plurality of flash memory blocks may be flash memory blocks with successive addresses, so that one address segment with successive addresses may be allocated for the big data.

In an exemplary embodiment of the present application, when a large amount of storage objects to be stored are all small data, a second storing instruct may be generated each time a small data is written. In another embodiment, a plurality of small data which requires to be written successively may be combined and then be written, i.e., a second storing instruction may be generated after the combination, thereby reducing the task load of the storage system, improving the performance of the storage system and reducing the power consumption.

In the exemplary embodiment of the present application, for example, after receiving a plurality of first writing instructions about the plurality of small data, the information carried by the plurality of first writing instructions may be combined, one second storing instruction is generated according to the combined information and the SSD resource information maintained locally and sent to the SSD, and then the SSD obtains each small data respectively according to the corresponding starting source address and stores it in the allocated flash memory address.

In an exemplary embodiment of the present application, when the starting source address of the plurality of small data is successive, the plurality of successive flash memory addresses may be allocated for the plurality of small data according to an arrangement order of small data stored in the plurality of starting source addresses, and the arrangement order of the small data stored in the plurality of successive flash memory addresses is the same as the arrangement order of the small data stored in the plurality of starting source addresses.

In an exemplary embodiment of the present application, when the storage object is allocated to the plurality of different SSDs or different flash memory addresses in the same SSD, data amount required for each flash memory address may be acquired from an external requester and stored in the flash memory address, so a starting source address of a portion of data to be stored each time may be determined according to the starting source address of the data of the entire storage object, the offset of the portion of data of the storage object to be stored each time in the data of the entire storage object; and the corresponding data for storage is thus acquired according to the starting source address of the portion of data.

In an exemplary embodiment of the present application, when the storing processor 121 sends the second storing instruction to the SSD, one second storing instruction may be sent to each allocated flash memory address, or one second storing instruction may be sent for a plurality of flash memory successive addresses (i.e. an address segment).

In an exemplary embodiment of the present application, the second storing instruction may include, but is not limited to, an NVMe storing instruction.

In an exemplary embodiment of the present application, the flash memory address carried by the second storing instruction may be represented by an address of one flash memory page; and when the storing processor 121 generates one or more second storing instructions for each SSD to which a flash memory address is allocated, it means that the storing processor 121 generates one second storing instruction for each flash memory page allocated in the SSD, the generated one second storing instruction carries a starting source address of data to be stored in the flash memory page and an address of the flash memory page.

In an exemplary embodiment of the present application, the flash memory address carried by the second storing instruction may be an address segment formed by addresses of a plurality of successive flash memory pages, and the address segment is represented by a starting address and data amount information; and when the storing processor 121 generates one or more second storing instructions for each SSD to which a flash memory address is allocated, it means that the storing processor 121 may generate one second storing instruction for each address segment in the SSD, the generated one second storing instruction carries a starting source address of data to be stored in the address segment, a starting address of the address segment and data amount information.

In an exemplary embodiment of the present application, the second storing instruction may only include the starting source address and flash memory address of the storage object, or may contain both the starting source address and the flash memory address (for example, the starting addresses of a plurality of flash memory pages or blocks) of the storage object and the data amount information of the storage object.

In an exemplary embodiment of the present application, when the second storing instruction is an NVMe storing instruction, the NVMe storing instruction may be a common NVMe instruction, including a starting source address and a flash memory address of the storage object; alternatively, the NVMe storing instruction may be an extended NVMe instruction, including a starting source address of the storage object, data amount information, and a flash memory address.

In an exemplary embodiment of the present application, the data amount information may contain, but is not limited to, a total data capacity (e.g., 32K, 64K, etc.), a total number of at least one of the flash memory pages and the flash memory blocks which are required, and the like.

In an exemplary embodiment of the present application, for example, for the small data, the data may be stored through only one flash memory page, so one flash memory page may be allocated for the small data, and only the starting source address of the storage object and the address of the flash memory page are included in the second storing instruction.

In an exemplary embodiment of the present application, for example, for the big data, a plurality of flash memory pages are required to store the data, so for the big data, a plurality of flash memory pages may be allocated and data amount information may be attached for example, a total number of the required flash memory pages is attached, and a starting source address, a flash memory address (a starting address of at least one of the allocated flash memory pages and flash memory blocks), and data amount information of the storage object are contained in the second storing instruction.

In an exemplary embodiment of the present application, the size of each flash memory block may be 16 kB, so the starting address of the first flash memory block is equal to the original starting address, the starting address of the second flash memory block is equal to the original starting address+16 kB, and so on, and a starting address of any one of the flash memory block may be determined. For the flash memory page, the principle is the same, and will not be repeated here.

In an exemplary embodiment of the present application, the storing processor 121 is further configured to generate one or more second storing instructions for each SSD allocated with a flash memory address and send the one or more second storing instructions to the SSD, and then, after receiving a success response to all the second storing instructions sent, return a success response to the sender of the first storing instruction and notify the information manager 13 to record the identification of the storage object and the allocated flash memory address in the SSD.

In an exemplary embodiment of the present application, the storage management system 12 may include a reading processor 122, which is configured to: receive a first reading instruction from the external through the first PCIe bus interface 11, and parse the identification of the storage object and the starting address for data reception carried by the first reading instruction; look up the flash memory address or addresses in one or more SSDs in which the data of the storage object is stored according to the identification of the storage object, wherein the flash memory address or addresses are saved in advance; and generate one or more second reading instructions for each SSD storing the data of the storage object and send the one or more second reading instructions to the SSD, wherein each second reading instruction carries the flash memory address of the data to be read this time in the SSD and the starting address for data reception.

In an exemplary embodiment of the present application, when the first operation instruction sent from the external requester is a first reading instruction, the first reading instruction may include, but is not limited to, an identification of the storage object, and a starting address for data reception.

In an exemplary embodiment of the present application, the CSP may look up the flash memory address of the data of the storage object to be read in the SSD according to the identification of the storage object contained in the first reading instruction, and carry the flash memory address and the starting address for data reception of the external requester in the second reading instruction and send them to the SSD.

In an exemplary embodiment of the present application, the data of the storage object to be read may be big data or may be small data, wherein when the data of this storage object is big data and occupies (e.g., exactly fully, or not fully with waste) at least one of one or more complete flash memory pages and flash memory blocks, the addresses of at least one of the one or more flash memory pages and flash memory blocks, and the starting address for data reception may be carried only in the second reading instruction. When the data of the storage object is big data and occupies at least one of the plurality of successive flash memory pages and flash memory blocks, the starting address of at least one of the plurality of successive flash memory pages and flash memory blocks may be carried in the second reading instruction, and the number of at least one of the flash memory pages and the flash memory blocks is indicated by the data amount information, so the starting addresses of at least one of the plurality of successive flash memory pages and the flash memory blocks, the data amount information and the starting address for data reception of the storage object may be carried in the second reading instruction. When the data of the storage object is small data and only occupies one portion of the space of one flash memory page, and the other portion of the space of the flash memory page is occupied by other data, both the address of the flash memory page and the offset of the flash memory address of the storage object to be read may be carried in the second reading instruction, so as to accurately read the required data in the flash memory page according to the offset, so the second reading instruction may carry the address and the offset of the flash memory page, as well as the starting address for data reception.

In an exemplary embodiment of the present application, the second reading instruction may contain, but is not limited to, an NVMe reading instruction.

In an exemplary embodiment of the present application, the second reading instruction may be an NVMe reading instruction, and the flash memory address carried by the NVMe reading instruction is an address of one flash memory page; and alternatively, the second reading instruction may be an extended NVMe storing instruction, and the flash memory address carried by the extended NVMe reading instruction is an address segment formed by addresses of one or more successive flash memory pages, and the address segment may be represented by a starting address and data amount information.

In an exemplary embodiment of the present application, when the second reading instruction is an NVMe reading instruction, the NVMe reading instruction may be an ordinary NVMe instruction, including a flash memory address and a starting address for data reception of the storage object; and alternatively, the NVMe storing instruction may be an extended NVMe instruction, including a flash memory address, data amount information, and a starting address for data reception of the storage object.

In an exemplary embodiment of the present application, the data amount information may contain, but is not limited to, a total data capacity (e.g., 32K, 64K, etc.), a total number of at least one of the flash memory pages and the flash memory blocks which are required, and the like.

In an exemplary embodiment of the present application, the offset is referred to an offset of the small data in one flash memory page relative to the flash memory address of the flash memory page, and the offset may be represented by two offset quantities.

In an exemplary embodiment of the present application, the small data may only be stored in one flash memory page, which may completely occupy one flash memory page, or may only occupy one portion of the flash memory page, and the other portion is occupied by other small data. Therefore, for the small data that completely occupies one flash memory page, only the starting address for data reception of the storage object and the address of the flash memory page may be included in the second reading instruction, and for the small data that occupies one flash memory page together with other small data, the starting address for data reception of the storage object, the address of the flash memory page and the offset of the small data may be included in the second reading instruction, which is used for SSD to read data from the flash memory page and then select required data from the read data according to the offset.

In an exemplary embodiment of the present application, for the big data, a plurality of flash memory pages are required to store the data, so the data amount information (e.g., the total number of flash memory pages for storage) may be attached when the big data is read, and the starting address for data reception, the flash memory address (the starting address of at least one of the flash memory pages and flash memory blocks storing data), and the data amount information of the storage object are included in the second reading instruction.

In an exemplary embodiment of the present application, the size of each flash memory block may be 16 kB, so the starting address of the first flash memory block is equal to the original starting address, the starting address of the second flash memory block is equal to the original starting address+16 kB, and so on, and a starting address of any one of the flash memory blocks may be determined. For the flash memory page, the principle is the same, and will not be repeated here.

In an exemplary embodiment of the present application, the flash memory address carried by the second reading instruction may be represented by an address of one flash memory page; and when the reading processor 122 generates one or more second reading instructions for each SSD storing the data to be read this time, it means that the reading processor 122 may generate a second reading instruction for each flash memory page allocated in the SSD, the second reading instruction carries the address of the flash memory page to be read and the starting address for data reception.

In an exemplary embodiment of the present application, for the second reading instruction containing only a flash memory address and a starting address for data reception, the SSD may read out all the data stored in at least one of one or more corresponding flash memory pages and flash memory blocks in the present SSD according to the flash memory address, and store the data to the starting address for data reception.

In an exemplary embodiment of the present application, the flash memory address carried by the second reading instruction may be represented by an address of one flash memory page; and when the reading processor 122 generates one or more second reading instructions for each SSD storing the data to be read this time, it means that the reading processor 122 may generate a second reading instruction for each flash memory page allocated in the SSD, the second reading instruction carries the address of the flash memory page to be read, the offset of the data to be read this time relative to the address of the flash memory page, and the starting address for data reception.

In an exemplary embodiment of the present application, for the second reading instruction containing a flash memory address, an offset, and a starting address for data reception, the SSD may read out all the data stored in one corresponding flash memory page according to the flash memory address, select required data from the read data according to the offset, and store the selected data to the starting address for data reception; and alternatively, read a portion of the stored data from one flash memory page according to the parsed flash memory address and offset thereof.

In an exemplary embodiment of the present application, the flash memory address carried by the second reading instruction may be an address segment formed by addresses of a plurality of successive flash memory pages, and the address segment is represented by a starting address and data amount information; and when the reading processor 122 generates one or more second reading instructions for each SSD to which a flash memory address is allocated, it means that the reading processor 122 may generate a second reading instruction for each address segment in the SSD, the second reading instruction carries a starting address of the address segment to be read, data amount information, and a starting address for data reception.

In an exemplary embodiment of the present application, for the second reading instruction containing a flash memory address, data amount information and a starting address for data reception, the SSD may read out all the data stored in at least one of corresponding plurality of flash memory pages and flash memory blocks according to the flash memory address and the data amount information, and store the data to the starting address for data reception.

Third Aspect

Figure 3:
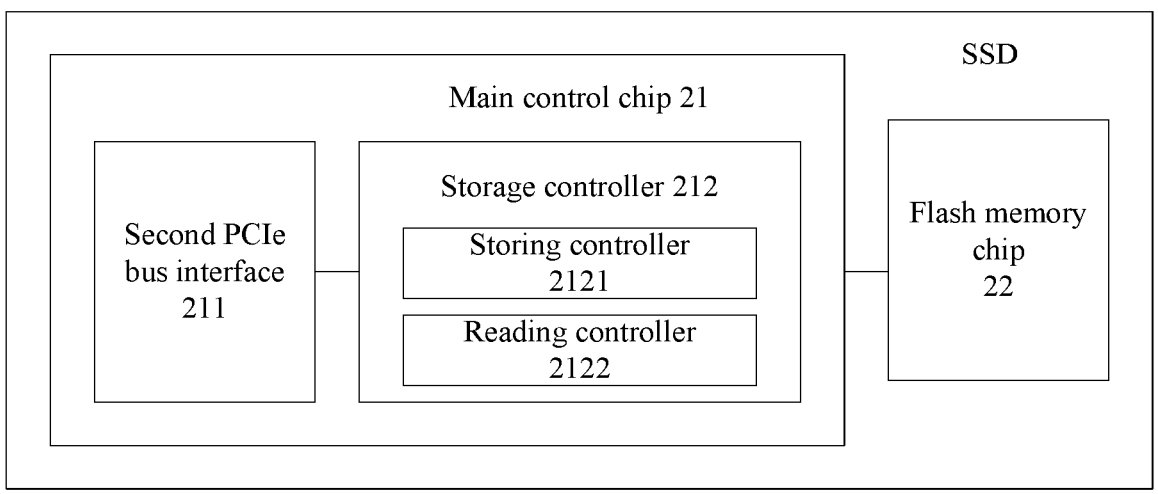
FIG. 3 is a block diagram of a first composition of an SSD in a storage system to an embodiment of the present application.

An embodiment of the present application provides a solid-state drive (SSD) in a storage system, as shown in FIG. 3, which may include a main control chip 21 and a flash memory chip 22. The main control chip 21 may include: a second PCIe bus interface 211 configured to be connected to the PCIe bus to communicate with a CSP in the storage system and the external of the storage system through the PCIe bus; and a storage controller 212 configured to receive the second operation instruction based on the flash memory address sent by the CSP, and exchange the data of the storage object with the external according to the information carried by the second operation instruction, wherein the second operation instruction includes a second storing instruction and a second reading instruction.

In an exemplary embodiment of the present application, the CSP receives an external storage request through the first PCIe bus interface 11, that is, the first operation instruction mentioned above, which may contain information about the storage object. According to the information about the storage object and the stored resource information of each SSD, the CSP may perform a processing, such as allocating an SSD address for the data of the storage object, or looking up an SSD address in which the data of the storage object is stored, or the like, and may generate the corresponding second operation instruction according to the processing result. By using the point-to-point communication mechanism of the PCIe bus, the CSP may send the generated second operation instruction to the or main control chip 21 of the SSD allocated or looked up through the second PCIe bus interface 211, so that the storage controller 212 of the main control chip 21 of the SSD may directly exchange data with the external requester according to the second operation instruction instead of via the CSP, only instructions are transmitted between the CSP and the SSD, there will be no large amount of data flowing through the CSP, and the CSP will not copy extra data, thus reducing the workload of the CSP greatly, and reducing the delay and the power consumption.

The solution of the embodiments of the present application is described below in detail from two aspects, i.e., writing data and reading data, respectively.

In an exemplary embodiment of the present application, the storage controller 212 may include a storing controller 2121, which is configured to: receive the second storing instruction, and parse the starting source address of the data of the storage object and the flash memory address for storing the data in the present SSD carried by the second storing instruction; and read the data of the storage object from the external according to the parsed starting source address, and store the read data in the parsed flash memory address.

In an exemplary embodiment of the present application, when the storing processor 121 sends the second storing instruction to the SSD, one second storing instruction may be sent to each allocated flash memory address, or one second storing instruction may be sent for a plurality of flash memory successive addresses (i.e., an address segment).

In an exemplary embodiment of the present application, the second storing instruction may include, but is not limited to, an NVMe storing instruction.

In an exemplary embodiment of the present application, the flash memory address is any form of address provided to the external by the SSD, which may be, for example, an address of a flash memory page, a flash memory block or a storage block, or may also be an address segment of a flash memory page, a flash memory block, or a storage block. When the flash memory address is a storage block address, the SSD provides a logical address to the external, and when the flash memory address is an address of a flash memory page or a flash memory block, the SSD provides an operation interface of a physical address to the external. In the embodiment of the present application, it is illustrated by taking an example in which the flash memory address is an address of a flash memory page or a flash memory block.

In an exemplary embodiment of the present application, the parsed flash memory address may be an address of one flash memory page; the storing controller 2121 may be configured to read data of one flash memory page size of the storage object from the external according to the parsed starting source address, and store the data in the parsed address of the flash memory page; alternatively, the parsed flash memory address may be an address segment represented by a starting source address and data amount information; the address segment contains addresses of a plurality of complete flash memory pages; and the storing controller 2121 may be configured to read data of the corresponding data amount of the storage object from the external according to the parsed starting source address and the data amount information, and store the data in the parsed address segment.

In an exemplary embodiment of the present application, the second storing instruction may only include the starting source address and flash memory address of the storage object, or may contain both the starting source address and the flash memory address (for example, the starting address of a plurality of flash memory pages or blocks) of the storage object and the data amount information of the storage object.

In an exemplary embodiment of the present application, when the second storing instruction is an NVMe storing instruction, the NVMe storing instruction may be a common NVMe instruction, including a starting source address and a flash memory address of the storage object; alternatively, the NVMe storing instruction may be an extended NVMe instruction, including a starting source address of the storage object, data amount information, and a flash memory address.

In an exemplary embodiment of the present application, the data amount information may contain, but is not limited to, a total data capacity (e.g., 32K, 64K, etc.), a total number of at least one of the flash memory pages and the flash memory blocks which are required, and the like.

In an exemplary embodiment of the present application, for example, for the small data, the data may be stored through only one flash memory page, so one flash memory page may be allocated for the small data, and only the starting source address of the storage object and the address of the flash memory page are included in the second storing instruction.

In an exemplary embodiment of the present application, for example, for the big data, a plurality of flash memory pages are required to store the data, so for the big data, a plurality of flash memory pages may be allocated and data amount information may be attached, for example, a total number of the required flash memory pages is attached, and a starting source address, a flash memory address (a starting address of at least one of the allocated one or more flash memory pages and flash memory blocks), and data amount information of the storage object are contained in the second storing instruction.

In an exemplary embodiment of the present application, the size of each flash memory block is 16 kB, so the starting address of the first flash memory block is equal to the original starting address, the starting address of the second flash memory block is equal to the original starting address+ 16 kB, and so on, and a starting address of any one of the flash memory blocks may be determined.

In an exemplary embodiment of the present application, the storing controller 2121 is further configured to, after receiving the second storing instruction successfully sent by the CSP and writing the data successfully, return a success response to the CSP. The storing controller 2121 may return a success response after writing data successfully according to each second storing instruction, or return a success response after writing data successfully according to all second storing instructions.

In an exemplary embodiment of the present application, the storage controller 212 may include a reading controller 2122, which is configured to: receive the second reading instruction, parse the flash memory address of the data of the storage object in the present SSD for storing data and the starting address for data reception carried by the second reading instruction; and read the data of the storage object from the present SSD according to the parsed flash memory address, and store the read data in the starting address of data reception of the external.

In an exemplary embodiment of the present application, the CSP may look up the flash memory address of the data of the storage object to be read in the SSD according to the identification of the storage object contained in the first reading instruction, and carry the flash memory address and the starting address for data reception of the external requester in the second reading instruction to send to the SSD.

In an exemplary embodiment of the present application, the data of the storage object to be read may be big data or may be small data. When the data of this storage object is big data and occupies (e.g., exactly fully, or not fully with waste) at least one of one or more complete flash memory pages and flash memory blocks, the addresses of at least one of the one or more flash memory pages and flash memory blocks, and the starting address for data reception may be carried only in the second reading instruction. When the data of the storage object is big data and occupies at least one of the plurality of successive flash memory pages and flash memory blocks, the starting address of at least one of the plurality of successive flash memory pages and flash memory blocks may be carried in the second reading instruction, and the number of at least one of the flash memory pages and the flash memory blocks is indicated by the data amount information, so the starting addresses of at least one of the plurality of successive flash memory pages and the flash memory blocks, the data amount information and the starting address for data reception of the storage object may be carried in the second reading instruction. When the data of the storage object is small data and only occupies one portion of the space of one flash memory page, and the other portion of the space of the flash memory page is occupied by other data, both the address of the flash memory page and the offset of the flash memory address of the storage object to be read may be carried in the second reading instruction, so as to accurately read the required data in the flash memory page according to the offset, so the second reading instruction may carry the address and the offset of the flash memory page, as well as the starting address for data reception.

In an exemplary embodiment of the present application, the second reading instruction may contain, but is not limited to, an NVMe reading instruction.

In an exemplary embodiment of the present application, the second reading instruction may be an NVMe reading instruction, and the flash memory address carried by the NVMe reading instruction is an address of one flash memory page; and alternatively, the second reading instruction may be an extended NVMe storing instruction, and the flash memory address carried by the extended NVMe reading instruction is an address segment formed by addresses of a plurality of successive flash memory pages, and the address segment may be represented by a starting address and data amount information.

In an exemplary embodiment of the present application, when the second reading instruction is an NVMe reading instruction, the NVMe reading instruction may be an ordinary NVMe instruction, including a flash memory address and a starting address for data reception of the storage object; and alternatively, the NVMe storing instruction may be an extended NVMe instruction, including a flash memory address, data amount information, and a starting address for data reception of the storage object.

In an exemplary embodiment of the present application, the data amount information may contain, but is not limited to, a total data capacity (e.g., 32K, 64K, etc.), a total number of at least one of the flash memory pages and the flash memory blocks which are required, and the like.

In an exemplary embodiment of the present application, the offset is referred to an offset of the small data in one flash memory page relative to the flash memory address of the flash memory page, and the offset may be represented by two offset quantities.

In an exemplary embodiment of the present application, the small data may only be stored in one flash memory page, which may completely occupy one flash memory page, or may only occupy one portion of the flash memory page, and the other portion is occupied by other small data. Therefore, for the small data that completely occupies one flash memory page, only the starting address for data reception of the storage object and the address of the flash memory page may be included in the second reading instruction, and for the small data that occupies one flash memory page together with other small data, the starting address for data reception of the storage object, the address of the flash memory page and the offset of the small data may be included in the second reading instruction, which is used for SSD to read data from the flash memory page and then select required data from the read data according to the offset.

In an exemplary embodiment of the present application, for the big data, a plurality of flash memory pages are required to store the data, so the data amount information (e.g., the total number of flash memory pages for storage) may be attached when the big data is read, and the starting address for data reception, the flash memory address (the starting address of at least one of the flash memory pages and flash memory blocks storing data), and the data amount information of the storage object are included in the second reading instruction.

In an exemplary embodiment of the present application, the size of each flash memory block may be 16 kB, so the starting address of the first flash memory block is equal to the original starting address, the starting address of the second flash memory block is equal to the original starting address+16 kB, and so on, and a starting address of any one of the flash memory blocks may be determined.

In an exemplary embodiment of the present application, the parsed flash memory address may be an address of one flash memory page; and the reading controller 2122 is configured to read the data of the storage object from the SSD according to the parsed address of the flash memory page, and store the data in the parsed starting address for data reception.

In an exemplary embodiment of the present application, for the second reading instruction containing only a flash memory address and a starting address for data reception, the SSD may read out all the data stored in at least one of one or more corresponding flash memory pages and flash memory blocks in the present SSD according to the flash memory address, and store the data to the starting address for data reception.

In an exemplary embodiment of the present application, the parsed flash memory address may be an address segment represented by a starting address and data amount information; and the reading controller 2122 is configured to read data of the corresponding data amount of the storage object from the SSD according to the parsed starting address and the data amount information, and store the data in the parsed starting address for data reception.

In an exemplary embodiment of the present application, for the second reading instruction containing a flash memory address, data amount information and a starting address for data reception, the SSD may read out all the data stored in at least one of corresponding plurality of flash memory pages and flash memory blocks according to the flash memory address and the data amount information, and store it in the starting address for data reception.

In an exemplary embodiment of the present application, the parsed flash memory address may be an address of one flash memory page and an offset of data to be read this time relative to the address of the flash memory page; and the reading controller 2122 is configured to read one page of data from the SSD according to the parsed address of the flash memory page, and select the required data from the one page of data according to the offset and store it in the parsed starting address for data reception.

In an exemplary embodiment of the present application, for the second reading instruction containing a flash memory address, an offset, and a starting address for data reception, the SSD may read out all the data stored in one corresponding flash memory page according to the flash memory address, select required data from the read data according to the offset, and store the selected data to the starting address for data reception; and alternatively, a portion of the stored data is read from one flash memory page according to the parsed flash memory address and offset thereof.

In an exemplary embodiment of the present application, the reading controller 2122 is further configured to, after receiving the second reading instruction successfully sent by the CSP and reading the data successfully, return a success response to the CSP.

Fourth Aspect

Figure 4:
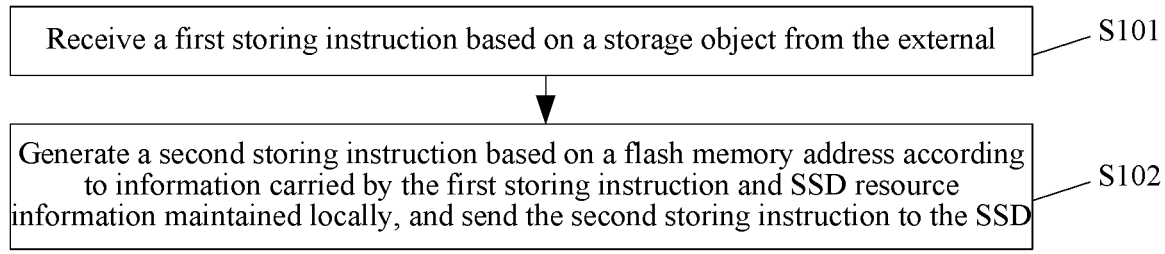
FIG. 4 is a flow chart of a data storing method at a CSP side according to an embodiment of the present application.

An embodiment of the present application provides a data storing method, which is applied to a CSP in a storage system, wherein the CSP may communicate with an SSD in the storage system and the external of the storage system through a PCIe bus, and as shown in FIG. 4, the method may include acts S101-S102.

In the S101, a first storing instruction based on a storage object from the external is received.

In an exemplary embodiment of the present application, the CSP communicates with an external requester based on a point-to-point communication mechanism through the PCIe bus to receive an external storage request, for example, the first storing instruction mentioned above, which may contain information about the storage object.

In an exemplary embodiment of the present application, the first storing instruction may include, but is not limited to, an identification of the storage object, data length information, and a starting source address of the entire data.

In the S102, a second storing instruction based on the flash memory address is generated according to the information carried by the first storing instruction and the SSD resource information maintained locally, and sent the generated second storing instruction to the SSD.

In an exemplary embodiment of the present application, the SSD resource information may include resource occupancy information in the SSD; and the resource occupancy information in the SSD may include, but is not limited to, addresses of all SSDs included in the storage system, an address of at least one of the flash memory page and the flash memory block in each SSD, resource occupancy information for each flash memory page, an identification and offset of a storage object corresponding to each occupied flash memory page, and the like.

In the exemplary embodiment of the present application, the CSP may perform a processing such as SSD address allocation on the data of the storage object according to the information about the storage object and the stored resource information of each SSD, and generate corresponding second storing instruction according to the processing result. By using the point-to-point communication mechanism of the PCIe bus, the CSP may send the generated second operation instruction to the allocated SSD, so that the SSD may directly exchange data with an external requester according to the second storing instruction instead of via the CSP, only instructions are transmitted between the CSP and the SSD, there will be no large amount of data flowing through the CSP, and the CSP will not copy extra data, thus reducing the workload of the CSP greatly, and reducing the delay and the power consumption.

In the exemplary embodiment of the present application, generating the second storing instruction based on the flash memory address according to the information carried by the first storing instruction and the SSD resource information maintained locally and sending the generated second storing instruction to the SSD may include:

parsing an identification of a storage object, data length information and a starting source address of entire data, which are carried by the first storing instruction;

allocating a flash memory address or addresses in one or more SSDs for storing data of the storage object according to the data length information and the resource occupancy information in the SSD; and determining a starting source address of a portion of data to be stored each time according to the starting source address of entire data and an offset of a portion of data of the storage object to be stored each time in the entire data of the storage object; and generating one or more second storing instructions for each SSD allocated with a flash memory address, and sending the one or more second storing instructions to the SSD, wherein each second storing instruction carries a starting source address of data to be stored by the SSD and a flash memory address for data to be stored.

In an exemplary embodiment of the present application, the flash memory address is any form of address provided to the external by the SSD, which may be, for example, an address of a flash memory page, a flash memory block or a storage block, or may be an address segment of a flash memory page, a flash memory block, or a storage block. When the flash memory address is a storage block address, the SSD provides a logical address to the external, and when the flash memory address is an address of a flash memory page or a flash memory block, the SSD provides an operation interface of a physical address to the external. In the embodiment of the present application, it is illustrated by taking an example in which the flash memory address is an address of a flash memory page or a flash memory block.

In an exemplary embodiment of the present application, the CSP may determine flash memory address or addresses in one or more SSDs, in which the data of the storage object to be stored currently may be stored, according to the resource occupancy information of the SSD, and allocate one or more flash memory addresses to this storage object according to the size of the data amount of the storage object to be stored.

In an exemplary embodiment of the present application, the CSP may first determine whether the data of the storage object to be stored is big data or small data according to the data length information carried by the first storing instruction, and allocate a corresponding flash memory address according to the size of the determined data.

In an exemplary embodiment of the present application, when the data length information is less than or equal to a preset first data amount threshold, the data may be determined as small data; and when the data length information is larger than the preset first data amount threshold, the data may be determined as big data.

In an exemplary embodiment of the present application, the first data amount threshold may be the storage data amount of one flash memory page, or may be self-defined data amount, and the detailed value of the first data amount threshold is not limited here.

In an exemplary embodiment of the present application, when the data to be stored is small data, the CSP may allocate only one flash memory page for the data, and when the data to be stored is big data, the CSP may allocate a plurality of flash memory pages for the data, or allocate one or more flash memory blocks.

In an exemplary embodiment of the present application, when the CSP allocates at least one of the plurality of flash memory pages and the plurality of flash memory blocks for big data, the plurality of flash memory pages may be flash memory pages with successive addresses, and the plurality of flash memory blocks may be flash memory blocks with successive addresses, so that one address segment with successive addresses may be allocated for the big data.

In an exemplary embodiment of the present application, when a large amount of storage objects to be stored are all small data, one second storing instruction may be generated every time one small data is written; and in another embodiment, a plurality of small data required to be successively written may be combined and then written, that is, just one second storing instruction may be generated after combination, thereby reducing the task load of the storage system, improving the performance of the storage system and reducing the power consumption.

In an exemplary embodiment of the present application, for example, after receiving a plurality of first writing instructions about the plurality of small data, the information carried by the plurality of first writing instructions may be combined, one second storing instruction is generated according to the combined information and the SSD resource information maintained locally and sent to the SSD, and then the SSD obtains each small data respectively according to the corresponding starting source address and stores it in the allocated flash memory address.

In an exemplary embodiment of the present application, when the starting source address of the plurality of small data is successive, the plurality of successive flash memory addresses may be allocated for the plurality of small data according to an arrangement order of small data stored in the plurality of starting source addresses, and the arrangement order of the small data stored in the plurality of successive flash memory addresses is the same as the arrangement order of the small data stored in the plurality of starting source addresses.

In an exemplary embodiment of the present application, when the storage object is allocated to the plurality of different SSDs or different flash memory addresses in the same SSD, data amount required for each flash memory address may be acquired from an external requester and stored in the flash memory address, so a starting source address of a portion of data to be stored each time may be determined according to the starting source address of the data of the entire storage object, the offset of the portion of data of the storage object to be stored each time in the data of the entire storage object; and the corresponding data for storage is thus acquired according to the starting source address of the portion of data.

In an exemplary embodiment of the present application, when the CSP sends the second storing instruction to the SSD, one second storing instruction may be sent to each allocated flash memory address, or one second storing instruction may be sent for a plurality of flash memory successive addresses (i.e. an address segment).

In an exemplary embodiment of the present application, the second storing instruction may include, but is not limited to, an NVMe storing instruction.

In an exemplary embodiment of the present application, the second storing instruction may be an NVMe storing instruction, and the flash memory address carried by the NVMe storing instruction is an address of one flash memory page; and alternatively, the second storing instruction may be an extended NVMe storing instruction, and the flash memory address carried by the extended NVMe storing instruction is an address segment formed by addresses of a plurality of successive flash memory pages, and the address segment may be represented by a starting address and data amount information.

In an exemplary embodiment of the present application, the second storing instruction may only include the starting source address and flash memory address of the storage object, or may contain both the starting source address and the flash memory address (for example, the starting address of a plurality of flash memory pages or blocks) of the storage object and the data amount information of the storage object.

In an exemplary embodiment of the present application, when the second storing instruction is an NVMe storing instruction, the NVMe storing instruction may be a common NVMe instruction, including a starting source address and a flash memory address of the storage object; alternatively, the NVMe storing instruction may be an extended NVMe instruction, including a starting source address of the storage object, data amount information, and a flash memory address.

In an exemplary embodiment of the present application, the data amount information may contain, but is not limited to, a total data capacity (e.g., 32K, 64K, etc.), a total number of at least one of the flash memory pages and the flash memory blocks which are required, and the like.

In an exemplary embodiment of the present application, for example, for the small data, the data may be stored through only one flash memory page, so one flash memory page may be allocated for the small data, and only the starting source address of the storage object and the address of the flash memory page are included in the second storing instruction.

In an exemplary embodiment of the present application, for example, for the big data, a plurality of flash memory pages are required to store the data, so for the big data, a plurality of flash memory pages may be allocated and data amount information may be attached, for example, a total number of the required flash memory pages is attached, and a starting source address, a flash memory address (a starting address of at least one of the allocated one or more flash memory pages and flash memory blocks), and data amount information of the storage object are contained in the second storing instruction.

In an exemplary embodiment of the present application, the size of each flash memory block is 16 kB, so the starting address of the first flash memory block is equal to the original starting address, the starting address of the second flash memory block is equal to the original starting address+ 16 kB, and so on, and a starting address of any one of the flash memory blocks may be determined.

In an exemplary embodiment of the present application, the CSP also receives a success response returned by the SSD after the SSD successfully receives the second storing instruction and successfully writes the data.

Fifth Aspect

Figure 5:
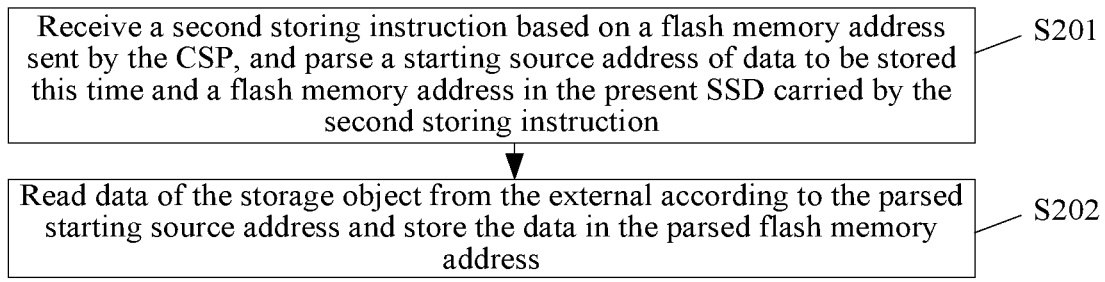
FIG. 5 is a flow chart of a data storing method at an SSD side according to an embodiment of the present application.

An embodiment of the present application provides a data storing method, which is applied to an SSD in a storage system, wherein the SSD communicates with a CSP in the storage system and the external of the storage system through a PCIe bus, and as shown in FIG. 5, the method may include acts S201-S202.

In the S201, a second storing instruction based on a flash memory address sent by the CSP is received, and a starting source address of data to be stored this time and a flash memory address in the present SSD carried by the second storing instruction are parsed.

In an exemplary embodiment of the present application, when the SSD receives the second storing instruction sent by the CSP, it means that for each flash memory address, the SSD may receive one second storing instruction respectively, or for a plurality of flash memory successive addresses (i.e. an address segment), the SSD may receive one second storing instruction.

In an exemplary embodiment of the present application, the second storing instruction may include, but is not limited to, an NVMe storing instruction.

In an exemplary embodiment of the present application, the second storing instruction may only include the starting source address and flash memory address of the storage object, or may contain both the starting source address and the flash memory address (for example, the starting address of a plurality of flash memory pages or blocks) of the storage object and the data amount information of the storage object.

In an exemplary embodiment of the present application, when the second storing instruction is an NVMe storing instruction, the NVMe storing instruction may be a common NVMe instruction, including a starting source address and a flash memory address of the storage object; alternatively, the NVMe storing instruction may be an extended NVMe instruction, including a starting source address of the storage object, data amount information, and a flash memory address; and In an exemplary embodiment of the present application, the data amount information may contain, but is not limited to, a total data capacity (e.g., 32K, 64K, etc.), a total number of at least one of the flash memory pages and the flash memory blocks which are required, and the like.

In an exemplary embodiment of the present application, for example, for the small data, the data may be stored through only one flash memory page, so one flash memory page may be allocated for the small data, and only the starting source address of the storage object and the address of the flash memory page are included in the second storing instruction.

In an exemplary embodiment of the present application, for example, for the big data, a plurality of flash memory pages are required to store the data, so for the big data, a plurality of flash memory pages may be allocated and data amount information may be attached, for example, a total number of the required flash memory pages is attached, and a starting source address, a flash memory address (a starting address of at least one of the allocated one or more flash memory pages and flash memory blocks), and data amount information of the storage object are contained in the second storing instruction.

In an exemplary embodiment of the present application, for example, the size of each flash memory block is 16 kB, so the starting address of the first flash memory block is equal to the original starting address, the starting address of the second flash memory block is equal to the original starting address+16 kB, and so on, and a starting address of any one of the flash memory blocks may be determined.

In the S202, data of the storage object is read from the external according to the parsed starting source address and is stored in the parsed flash memory address.

In an exemplary embodiment of the present application, the second storing instruction may be an NVMe storing instruction, and the flash memory address carried by the NVMe storing instruction is an address of one flash memory page; and according to the parsed starting source address, reading the data of the storage object from the external and storing it in the parsed flash memory address includes: reading data of one flash memory page size of the storage object from the external according to the parsed starting source address, and storing it in the parsed address of the flash memory page.

In an exemplary embodiment of the present application, the second storing instruction may be an extended NVMe storing instruction, and the flash memory address carried by the extended NVMe storing instruction is an address segment formed by addresses of a plurality of successive flash memory pages, and the address segment is represented by a starting address and data amount information; and according to the parsed starting source address, reading the data of the storage object from the external and storing it in the parsed flash memory address includes: reading data of a corresponding data amount of the storage object from the external according to the parsed starting source address and data amount information, and storing it in the parsed address segment.

In an exemplary embodiment of the present application, after receiving successfully the second storing instruction sent by the CSP and writing the data successfully, the SSD returns a success response to the CSP. The SSD may return a success response after writing data successfully according to each second storing instruction, or return a success response after writing data successfully according to all second storing instructions.

Sixth Aspect

Figure 6:
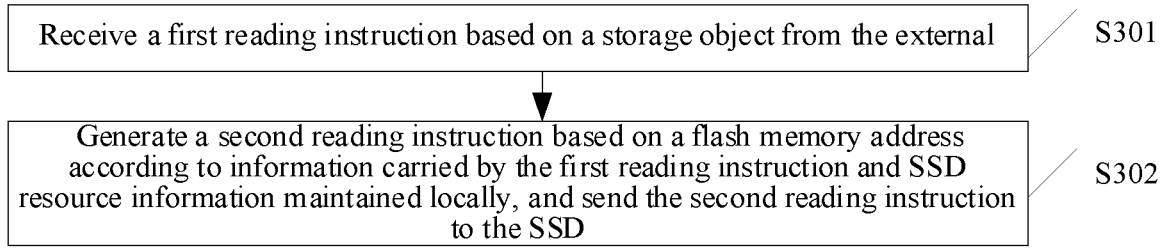
FIG. 6 is a flow chart of a data reading method at a CSP side according to an embodiment of the present application.

An embodiment of the present application provides a data reading method, which is applied to a CSP in a storage system, wherein the CSP communicates with an SSD in the storage system and the external of the storage system through a PCIe bus, and as shown in FIG. 6, the method may include acts S301-S302.

In the S301, a first reading instruction based on a storage object is received from the external.

In an exemplary embodiment of the present application, the CSP communicates with an external requester based on a point-to-point communication mechanism through the PCIe bus to receive an external storage request, for example, the first reading instruction mentioned above, which may contain information about the storage object required to be read.

In an exemplary embodiment of the present application, the first reading instruction may include, but is not limited to, an identification of the storage object and a starting address for data reception.

In the S302, a second reading instruction based on a flash memory address is generated according to information carried by the first reading instruction and SSD resource information maintained locally, and is sent to the SSD.

In an exemplary embodiment of the present application, the SSD resource information may include, but is not limited to, addresses of all SSDs included in the storage system, addresses of at least one of the flash memory pages and the flash memory blocks in each SSD, resource occupancy information for each flash memory page, an identification and offset of a storage object corresponding to each occupied flash memory page, and the like.

In an exemplary embodiment of the present application, the CSP may look up the flash memory address of the data of the storage object to be read in the SSD according to the identification of the storage object contained in the first reading instruction, and carry the flash memory address and the starting address for data reception of the external requester in the second reading instruction and send the second reading instruction to the SSD.

In the exemplary embodiment of the present application, generating the second reading instruction based on the flash memory address according to the information carried by the first reading instruction and the SSD resource information maintained locally and sending it to the SSD may include:

parsing the identification of the storage object and the starting address for data reception carried by the first reading instruction;

looking up the flash memory address or addresses in one or more SSDs in which the data to be read this time is stored according to the identification of the storage object, wherein the flash memory address or addresses are saved in advance; and generating one or more second reading instructions for each SSD storing the data of the storage object and sending them to the SSD, wherein each second reading instruction carries the flash memory address of the data to be read this time in the SSD and the starting address for data reception.

In an exemplary embodiment of the present application, the data of the storage object to be read may be big data or may be small data. When the data of this storage object is big data and occupies (e.g., exactly fully, or not fully with waste) at least one of one or more complete flash memory pages and flash memory blocks, the addresses of at least one of the one or more flash memory pages and flash memory blocks, and the starting address for data reception may be carried only in the second reading instruction. When the data of the storage object is big data and occupies at least one of the plurality of successive flash memory pages and flash memory blocks, the starting address of at least one of the plurality of successive flash memory pages and flash memory blocks may be carried in the second reading instruction, and the number of at least one of the flash memory pages and the flash memory blocks is indicated by the data amount information, so the starting addresses of at least one of the plurality of successive flash memory pages and the flash memory blocks, the data amount information and the starting address for data reception of the storage object may be carried in the second reading instruction. When the data of the storage object is small data and only occupies one portion of the space of one flash memory page, and the other portion of the space of the flash memory page is occupied by other data, both the address of the flash memory page and the offset of the flash memory address of the storage object to be read may be carried in the second reading instruction, so as to accurately read the required data in the flash memory page according to the offset, so the second reading instruction may carry the address and the offset of the flash memory page, as well as the starting address for data reception.

In an exemplary embodiment of the present application, when the CSP sends the second reading instruction to the SSD, one second reading instruction may be sent to each allocated flash memory address, or one second reading instruction may be sent for a plurality of flash memory successive addresses (i.e. an address segment).

In an exemplary embodiment of the present application, the second reading instruction may include, but is not limited to, an NVMe reading instruction.

In an exemplary embodiment of the present application, the second reading instruction may be an NVMe reading instruction, and the flash memory address carried by the NVMe reading instruction is an address of one flash memory page; and alternatively, the second reading instruction may be an extended NVMe storing instruction, and the flash memory address carried by the extended NVMe reading instruction is an address segment formed by addresses of one or more successive flash memory pages, and the address segment is represented by a starting address and data amount information.

In an exemplary embodiment of the present application, when the second reading instruction is an NVMe reading instruction, the NVMe reading instruction may be an ordinary NVMe instruction, including a flash memory address and a starting address for data reception of the storage object; and alternatively, the NVMe storing instruction may be an extended NVMe instruction, including a flash memory address, data amount information, and a starting address for data reception of the storage object.

In an exemplary embodiment of the present application, the data amount information may contain, but is not limited to, a total data capacity (e.g., 32K, 64K, etc.), a total number of at least one of the flash memory pages and the flash memory blocks which are required, and the like.

In an exemplary embodiment of the present application, the offset is referred to an offset of the small data in one flash memory page relative to the flash memory address of the flash memory page, and the offset may be represented by two offset quantities.

In an exemplary embodiment of the present application, the small data may only be stored in one flash memory page, which may completely occupy one flash memory page, or may only occupy one portion of the flash memory page, and the other portion is occupied by other small data. Therefore, for the small data that completely occupies one flash memory page, only the starting address for data reception of the storage object and the address of the flash memory page may be included in the second reading instruction, and for the small data that occupies one flash memory page together with other small data, the starting address for data reception of the storage object, the address of the flash memory page and the offset of the small data may be included in the second reading instruction, which is used for SSD to read data from the flash memory page and then select required data from the read data according to the offset.

In an exemplary embodiment of the present application, for the big data, a plurality of flash memory pages are required to store the data, so the data amount information (e.g., the total number of flash memory pages for storage) may be attached when the big data is read, and the starting address for data reception, the flash memory address (the starting address of at least one of the flash memory pages and flash memory blocks storing data), and the data amount information of the storage object are included in the second reading instruction.

In an exemplary embodiment of the present application, the size of each flash memory block may be 16 kB, so the starting address of the first flash memory block is equal to the original starting address, the starting address of the second flash memory block is equal to the original starting address+16 kB, and so on, and a starting address of any one of the flash memory blocks may be determined. For the flash memory page, the principle is the same, and will not be repeated here.

Seventh Aspect

Figure 7:
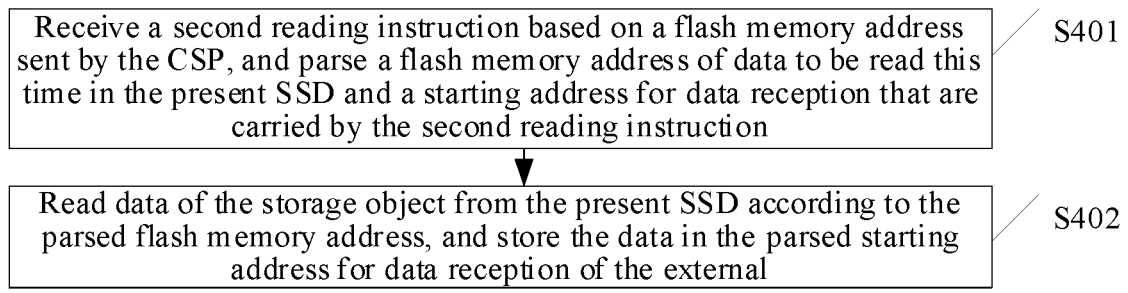
FIG. 7 is a flow chart of a data reading method at an SSD side according to an embodiment of the present application.

An embodiment of the present application provides a data reading method, which is applied to an SSD in a storage system, wherein the SSD communicates with a CSP in the storage system and the external of the storage system through a PCIe bus, and as shown in FIG. 7, the method may include acts S401-S402.

In the S401, a second reading instruction based on a flash memory address sent by the CSP is received, and a flash memory address of data to be read this time in this SSD and a starting address for data reception that are carried by the second reading instruction are parsed.

In an exemplary embodiment of the present application, the CSP may look up the flash memory address of the data of the storage object to be read in the SSD according to the received identification of the storage object contained in the first reading instruction sent by the external requester, and carry the flash memory address and the starting address for data reception of the external requester in the second reading instruction and send the second reading instruction to the SSD.

In an exemplary embodiment of the present application, the data of the storage object to be read may be big data or may be small data. When the data of this storage object is big data and occupies (e.g., exactly fully, or not fully with waste) at least one of one or more complete flash memory pages and flash memory blocks, the addresses of at least one of the one or more flash memory pages and flash memory blocks, and the starting address for data reception may be carried only in the second reading instruction. When the data of the storage object is big data and occupies at least one of the plurality of successive flash memory pages and flash memory blocks, the starting address of at least one of the plurality of successive flash memory pages and flash memory blocks may be carried in the second reading instruction, and the number of at least one of the flash memory pages and the flash memory blocks is indicated by the data amount information, so the starting addresses of at least one of the plurality of successive flash memory pages and the flash memory blocks, the data amount information and the starting address for data reception of the storage object may be carried in the second reading instruction. When the data of the storage object is small data and only occupies one portion of the space of one flash memory page, and the other portion of the space of the flash memory page is occupied by other data, both the address of the flash memory page and the offset of the flash memory address of the storage object to be read may be carried in the second reading instruction, so as to accurately read the required data in the flash memory page according to the offset, so the second reading instruction may carry the address and the offset of the flash memory page, as well as the starting address for data reception.

In an exemplary embodiment of the present application, when the CSP sends the second reading instruction to the SSD, one second reading instruction may be sent to each allocated flash memory address, or one second reading instruction may be sent for a plurality of flash memory successive addresses (i.e. an address segment).

In an exemplary embodiment of the present application, the second reading instruction may include, but is not limited to, an NVMe reading instruction.

In an exemplary embodiment of the present application, the second reading instruction may be an NVMe reading instruction, and the flash memory address carried by the NVMe reading instruction is an address of one flash memory page; and alternatively, the second reading instruction may be an extended NVMe storing instruction, and the flash memory address carried by the extended NVMe reading instruction is an address segment formed by addresses of one or more successive flash memory pages, and the address segment may be represented by a starting address and data amount information.

In an exemplary embodiment of the present application, when the second reading instruction is an NVMe reading instruction, the NVMe reading instruction may be an ordinary NVMe instruction, including a flash memory address and a starting address for data reception of the storage object; and alternatively, the NVMe storing instruction may be an extended NVMe instruction, including a flash memory address, data amount information, and a starting address for data reception of the storage object.

In an exemplary embodiment of the present application, the data amount information may contain, but is not limited to, a total data capacity (e.g., 32K, 64*k*, etc.), a total number of at least one of the flash memory pages and the flash memory blocks which are required, and the like.

In an exemplary embodiment of the present application, the offset is referred to an offset of the small data in one flash memory page relative to the flash memory address of the flash memory page, and the offset may be represented by two offset quantities.

In an exemplary embodiment of the present application, the small data may only be stored in one flash memory page, which may completely occupy one flash memory page, or may only occupy one portion of the flash memory page, and the other portion is occupied by other small data. Therefore, for the small data that completely occupies one flash memory page, only the starting address for data reception of the storage object and the address of the flash memory page may be included in the second reading instruction, and for the small data that occupies one flash memory page together with other small data, the starting address for data reception of the storage object, the address of the flash memory page and the offset of the small data may be included in the second reading instruction, which is used for SSD to read data from the flash memory page and then select required data from the read data according to the offset.

In an exemplary embodiment of the present application, for the big data, a plurality of flash memory pages are required to store the data, so the data amount information (e.g., the total number of flash memory pages for storage) may be attached when the big data is read, and the starting address for data reception, the flash memory address (the starting address of at least one of the one or more flash memory pages and flash memory blocks for storage), and the data amount information of the storage object are included in the second reading instruction.

In an exemplary embodiment of the present application, the size of each flash memory block may be 16 kB, so the starting address of the first flash memory block is equal to the original starting address, the starting address of the second flash memory block is equal to the original starting address+16 kB, and so on, and a starting address of any one of the flash memory blocks may be determined. For the flash memory page, the principle is the same, and will not be repeated here.

In the S402, data of the storage object is read from the SSD according to the parsed flash memory address, and is stored in the parsed starting address for data reception of the external.

In an exemplary embodiment of the present application, the second reading instruction is an NVMe reading instruction, and the flash memory address carried by the NVMe reading instruction is an address of one flash memory page or one flash memory block; and according to the parsed flash memory address, reading the data of the storage object from the SSD and storing it in the parsed starting address for data reception of the external may include reading out all the data of the corresponding flash memory page or flash memory block from the SSD according to the parsed flash memory page or flash memory block address, and storing it in the parsed starting address for data reception of the external.

In an exemplary embodiment of the present application, for the second reading instruction containing only a flash memory address and a starting address for data reception, the SSD may read out all the data stored in at least one of one or more corresponding flash memory pages and flash memory blocks in the present SSD according to the flash memory address, and store the data in the starting address for data reception.

In an exemplary embodiment of the present application, the second reading instruction may be an extended NVMe reading instruction, and the flash memory address carried by the extended NVMe reading instruction is an address segment formed by addresses of a plurality of successive flash memory pages, and the address segment is represented by a starting address and data amount information; and according to the parsed flash memory address, reading the data of the storage object from the SSD and storing in the parsed starting address for data reception of the external may include reading data of the corresponding data amount of the storage object from the SSD according to the parsed address segment and data amount information, and storing the data in the parsed starting address for data reception of the external.

In an exemplary embodiment of the present application, for the second reading instruction containing a flash memory address, data amount information and a starting address for data reception, the SSD may read out all the data stored in at least one of corresponding plurality of flash memory pages and flash memory blocks according to the flash memory address and the data amount information, and store the data to the starting address for data reception.

In an exemplary embodiment of the present application, after successfully receiving the second reading instruction sent by the CSP and reading the data successfully, the SSD returns a success response to the CSP.

Eighth Aspect

Figure 8:
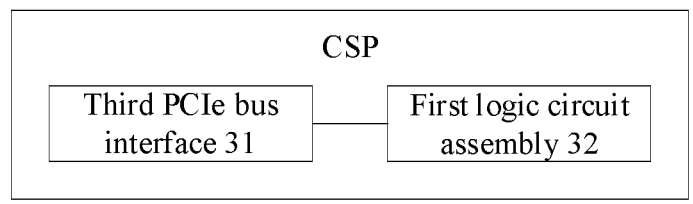
FIG. 8 is a block diagram of a second composition of a CSP in a storage system to an embodiment of the present application.

An embodiment of the present application provides a CSP, as shown in FIG. 8, which may include a third PCIe bus interface 31, and a first logic circuit assembly 32 coupled to the third PCIe bus interface 31, wherein the first logic circuit assembly 32 is configured to perform the data storing method of the fourth aspect and the data reading method of the sixth aspect.

In an exemplary embodiment of the present application, any embodiment in the fourth aspect and the sixth aspect aforementioned is applicable to the contents of the eighth aspect, and will not be repeated here.

Ninth Aspect

Figure 9:
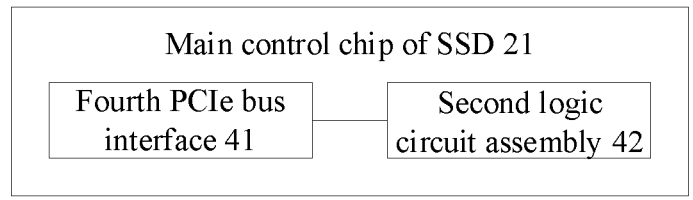
FIG. 9 is a block diagram of a second composition of an SSD in a storage system to an embodiment of the present application.

An embodiment of the present application also provides a main control chip 21 of an SSD, as shown in FIG. 9, which may include a fourth PCIe bus interface 41, and a second logic circuit assembly 42 coupled to the fourth PCIe bus interface 41, wherein the second logic circuit assembly 42 is configured to perform the data storing method of the fifth aspect and the data reading method of the seventh aspect.

In an exemplary embodiment of the present application, any embodiment in the first aspect to the seventh aspect aforementioned is applicable to the contents of the ninth aspect, and will not be repeated here.

Tenth Aspect

An embodiment of the present application provides a non-volatile storage medium having a computer program stored thereon, wherein when the computer program is executed by a processor, the data storing methods of the fourth and fifth aspects, and the data reading methods of the sixth and seventh aspects are performed.

In an exemplary embodiment of the present application, any embodiment in the first aspect to the seventh aspect aforementioned is applicable to the contents of the tenth aspect, and will not be repeated here.

It may be understood by those of ordinary skill in the art that all or some acts in a method and function modules/units in a system and an apparatus in the disclosure may be implemented as software, firmware, hardware, or an appropriate combination thereof. In a hardware implementation, division of the function modules/units mentioned in the above description is not always corresponding to division of physical assemblies. For example, a physical assembly may have multiple functions, or a function or an act may be executed by several physical assemblies in cooperation. Some assemblies or all assemblies may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skill in the art, a term computer storage medium includes volatile and nonvolatile, and removable and irremovable media implemented in any method or technology for storing information (for example, computer-readable instructions, a data structure, a program module, or other data). The computer storage medium includes, but is not limited to, RAM, ROM, EEPROM, a Flash RAM, or another memory technology, CD-ROM, a Digital Versatile Disk (DVD) or another optical disk storage, a magnetic box, a magnetic tape, magnetic disk storage or another magnetic storage apparatus, or any other media that may be used for storing desired information and may be accessed by a computer. In addition, it is known to those of ordinary skill in the art that the communication medium usually includes computer-readable instructions, a data structure, a program module, or other data in a modulated data signal of, such as, a carrier or another transmission mechanism, and may include any information delivery medium.

The invention claimed is:

1. A computational storage system, comprising a solid-state drive (SSD) and a computational storage processor (CSP), wherein communication between the SSD and the CSP, communication between the SSD and an external of the storage system, and communication between the CSP and the external of the storage system are performed through a point-to-point communication protocol of a peripheral component interconnect express (PCIe) bus;
   the CSP is configured to receive a first operation instruction based on a storage object from the external, generate a second operation instruction based on a flash memory address according to information carried by the first operation instruction and SSD resource information maintained locally, and send the generated second operation instruction to the SSD;
   the SSD is configured to, after receiving the second operation instruction, exchange data of the storage object with the external according to information carried by the second operation instruction;
   wherein, the first operation instruction comprises a first storing instruction or a first reading instruction, and the second operation instruction comprises a second storing instruction or a second reading instruction;
   wherein the SSD resource information comprises resource occupancy information in the SSD;
   the CSP is configured to, after receiving the first storing instruction, generate the second operation instruction based on the flash memory address by the following way and send the generated second operation instruction to the SSD:
   parsing an identification of a storage object, data length information and a starting source address of entire data, which are carried by the first storing instruction;
   allocating a flash memory address or addresses in one or more SSDs for storing the data of the storage object according to the data length information and the resource occupancy information in the SSD; and determining a starting source address of a portion of data to be stored each time according to the starting source address of the entire data and an offset of the portion of the data of the storage object to be stored each time in the entire data of the storage object; and
   generating one or more second storing instructions for each SSD allocated with a flash memory address and sending the generated one or more second storing instructions to the SSD, wherein each second storing instruction carries a starting source address of data to be stored in the SSD this time and a flash memory address for data storage.

2. The computational storage system according to claim 1, wherein,
   the SSD is configured to, after receiving the second storing instruction, exchange the data of the storage object with the external by the following way: parsing the starting source address and the flash memory address carried by the second storing instruction, reading data of a default size of the storage object from the external according to the parsed starting source address, and storing the read data into the parsed flash memory address; or, the second storing instruction sent by the CSP further carries data amount information of the storage object to be stored this time, and the SSD is configured to, when receiving the second storing instruction, exchange the data of the storage object with the eternal by the following way: parsing the starting source address, the flash memory address and the data amount information carried by the second storing instruction, reading data of a corresponding data amount of the storage object from the external according to the parsed starting source address and data amount information, and storing the read data into the parsed flash memory address.

3. The computational storage system according to claim 1, wherein, the SSD resource information comprises a flash memory address in the SSD in which the data of the storage object is stored;

the CSP is configured to, after receiving the first reading instruction, generate a second operation instruction based on a flash memory address by the following way and send the generated second operation instruction to the SSD:

parsing an identification of a storage object and a starting address for data reception that are carried by the first reading instruction;

looking up a flash memory address or addresses in one or more SSDs in which the data of the storage object is stored according to the identification of the storage object, wherein the flash memory address or addresses are saved in advanced; and generating one or more second reading instructions for each SSD storing the data of the storage object, and sending the generated one or more second reading instructions to the SSD, wherein each second reading instruction carries a flash memory address of data to be read this time in the SSD and the starting address for data reception.

4. The computational storage system according to claim 3, wherein, the SSD is configured to, after receiving the second reading instruction, exchange the data of the storage object with the external by the following way: parsing the flash memory address and the starting address for data reception that are carried by the second reading instruction, reading the data to be read this time from one or more SSDs according to the parsed flash memory address, and sending the read data to the starting address for data reception of the external; or, the second reading instruction sent by the CSP further carries data amount information of the storage object, and the SSD is configured to, when receiving the second reading instruction, exchange the data of the storage object with the external by the following way: parsing the flash memory address, the starting address for data reception and the data amount information that are carried by the second reading instruction, reading the data to be read this time from the SSD according to the parsed flash memory address and data amount information, and sending the read data to the starting address for data reception of the external; or, the second reading instruction sent by the CSP further carries an offset of the flash memory address of the storage object, and the SSD is configured to, when receiving the second reading instruction, exchange the data of the storage object with the external by the following way: parsing the flash memory address and the offset of the flash memory address, and the starting address for data reception that are carried by the second reading instruction, reading a portion of stored data from one flash memory page according to the parsed flash memory address and offset of the flash memory address, and storing the portion of the stored data into the starting address for data reception of the external; or, reading all data of a flash memory page, selecting required data from all the data according to the offset, and storing the selected data into the starting address for data reception of the external.

5. The computational storage system according to claim 1, wherein, the SSD is further configured to, after successfully exchanging the data of the storage object with the external according to the information carried by the second operation instruction, return a success response to the CSP; and the CSP is further configured to, after receiving a success response to all second operation instructions sent, return a success response to a sender of the first operation instruction and update the SSD resource information maintained locally.

6. A computational storage processor (CSP) in a storage system, comprising:

a first peripheral component interconnect express (PCIe) bus interface, configured to be connected to a PCIe bus to communicate with a solid-state drive (SSD) in the storage system and an external of the storage system through the PCIe bus;

a processor, configured to receive a first operation instruction based on a storage object from the external through the first PCIe bus interface, generate a second operation instruction based on a flash memory address according to information carried by the first operation instruction and SSD resource information maintained locally and send the generated second operation instruction to the SSD, wherein the first operation instruction comprises a first storing instruction or a first reading instruction, and the second operation instruction comprises a second storing instruction or a second reading instruction; and wherein the processor is configured to maintain the SSD resource information in the storage system;

wherein, the SSD resource information comprises resource occupation information in the SSD;

the processor is configured to:

receive a first storing instruction from the external through the first PCIe bus interface, and parse an identification of a storage object, data length information and a starting source address of entire data, which are carried by the first storing instruction;

allocate a flash memory address or addresses in one or more SSDs for storing data of the storage object according to the data length information and the resource occupancy information in the SSD; and determine a starting source address of a portion of data to be stored each time according to the starting source address of the entire data and an offset of the portion of the data of the storage object to be stored each time in the entire data of the storage object; and generate one or more second storing instructions for each SSD allocated with a flash memory address and send the generated one or more second storing instructions to the SSD, wherein each second storing instruction carries a starting source address of data to be stored in the SSD this time and a flash memory address for data storage.

7. The CSP according to claim 6, wherein, the flash memory address carried by the second storing instruction is represented by an address of one flash memory page; and when the processor generates the one or more second storing instructions for each SSD allocated with the flash memory address, the processor generates one second storing instruction for each flash memory page allocated in the SSD, wherein the second storing instruction carries a starting source address of data to be stored in the flash memory page and an address of the flash memory page.

8. The CSP according to claim 6, wherein, the flash memory address carried by the second storing instruction is an address segment formed by an address or addresses of one flash memory page or a plurality of successive flash memory pages, and the address segment is represented by a starting address and data amount information; and when the processor generates the one or more second storing instructions for each SSD allocated with the flash memory address, the processor generates one second storing instruction for each address segment in the SSD, wherein the second storing instruction carries a starting source address of data to be stored in the address segment, a starting address and data amount information of the address segment.

9. The CSP according to claim 6, wherein, the processor is further configured to generate one or more second storing instructions for each SSD allocated with a flash memory address and send the one or more second storing instructions to the SSD, and then, after receiving a success response to all second storing instructions sent, return a success response to a sender of the first storing instruction and notify the information manager to record the identification of the storage object and the allocated flash memory address in the SSD.

10. The CSP according to claim 6, wherein, the SSD resource information comprises a flash memory address in the SSD in which the data of the storage object is stored;

the processor is configured to:

receive a first reading instruction from the external through the first PCIe bus interface, and parse an identification of a storage object and a starting address for data reception that are carried by the first reading instruction;

look up a flash memory address or addresses in one or more SSDs in which the data of the storage object is stored according to the identification of the storage object, wherein the flash memory address or addresses are saved in advanced; and generate one or more second reading instructions for each SSD storing the data of the storage object, and send the generated one or more second reading instructions to the SSD, wherein each second reading instruction carries a flash memory address of data to be read this time in the SSD and the starting address for data reception.

11. The CSP according to claim 10, wherein, the flash memory address carried by the second reading instruction is represented by an address of one flash memory page; and when the processor generates one or more second reading instructions for each SSD storing the data to be read this time, the processor generates one second reading instruction for each flash memory page allocated in the SSD, wherein the second reading instruction carries an address of the flash memory page to be read and a starting address for data reception.

12. The CSP according to claim 10, wherein, the flash memory address carried by the second reading instruction is represented by an address of one flash memory page; and when the processor generates one or more second reading instructions for each SSD storing the data to be read this time, the processor generates one second reading instruction for each flash memory page allocated in the SSD, wherein the second reading instruction carries an address of the flash memory page to be read, an offset of the data to be read this time in stored data of the flash memory page, and a starting address for data reception.

13. The CSP according to claim 10, wherein, the flash memory address carried by the second reading instruction is an address segment formed by an address or addresses of one flash memory page or a plurality of successive flash memory pages, and the address segment is represented by a starting address and data amount information; and when the processor generates the one or more second reading instructions for each SSD allocated with the flash memory address, the processor generates one second reading instruction for each address segment in the SSD, wherein the second reading instruction carries a starting address and data amount information of the address segment to be read, and a starting address for data reception.

14. A data storing method, applied to a computational storage processor (CSP) in a storage system, wherein the CPS communicates with a solid-state drive (SSD) in the storage system and an external of the storage system through a peripheral component interconnect express (PCIe) bus, and the method comprises:

receiving a first storing instruction based on a storage object from the external; and generating a second storing instruction based on a flash memory address according to information carried by the first storing instruction and SSD resource information maintained locally, and sending the generated second storing instruction to the SSD;

wherein the SSD resource information comprises resource occupation information in the SSD;

generating the second storing instruction based on the flash memory address according to the information carried by the first storing instruction and the SSD resource information maintained locally, and sending the generated second storing instruction to the SSD, comprises:

parsing an identification of a storage object, data length information and a starting source address of entire data, which are carried by the first storing instruction;

allocating a flash memory address or addresses in one or more SSDs for storing data of the storage object according to the data length information and the resource occupancy information in the SSD;

generating one or more second storing instructions for each SSD allocated with a flash memory address and sending the generated one or more second storing instructions to the SSD, wherein each second storing instruction carries a starting source address of data to be stored in the SSD this time and a flash memory address for data storage.

15. The data storing method according to claim 14, wherein,
when allocating flash memory addresses in a plurality of SSDs for storing data of the storage object, determining a starting source address of a portion of data to be stored each time according to the starting source address of the entire data and an offset of the portion of the data of the storage object to be stored each time in the entire data of the storage object.

16. The data storing method according to claim 15, wherein,
the second storing instruction is an NVMe storing instruction, and a flash memory address carried by the NVMe storing instruction is an address of one flash memory page; or,
the second storing instruction is an extended NVMe storing instruction, and a flash memory address carried by the extended NVMe storing instruction is an address segment formed by an address or addresses of one or more successive flash memory pages, and the address segment is represented by a starting address and data amount information.

17. A computational storage processor (CSP), comprising a peripheral component interconnect express (PCIe) bus interface, and a first logic circuit assembly coupled to the PCIe bus interface; wherein the first logic circuit assembly is configured to perform the data storing method according to claim 14.

18. A non-transitory computer readable storage medium, having a computer program stored thereon, wherein when the computer program is executed by a processor, the data storing method according to claim 14 is implemented.

* * * * *